United States Patent
Messerges et al.

(10) Patent No.: US 10,796,393 B2
(45) Date of Patent: *Oct. 6, 2020

(54) SYSTEM FOR VALIDATING AND APPENDING INCIDENT-RELATED DATA RECORDS IN AN INTER-AGENCY DISTRIBUTED ELECTRONIC LEDGER

(71) Applicant: MOTOROLA SOLUTIONS, INC, Chicago, IL (US)

(72) Inventors: Thomas S Messerges, Schaumburg, IL (US); Michael D. Pearce, Barrington, IL (US); Lin Lin, Fox River Grove, IL (US); Eric Johnson, Chicago, IL (US); Jonathan Whitall, Naperville, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 318 days.

This patent is subject to a terminal disclaimer.

(21) Appl. No.: 15/920,715

(22) Filed: Mar. 14, 2018

(65) Prior Publication Data

US 2019/0287199 A1 Sep. 19, 2019

(51) Int. Cl.
*G06Q 10/10* (2012.01)
*G06Q 30/02* (2012.01)
(Continued)

(52) U.S. Cl.
CPC ........... *G06Q 50/265* (2013.01); *G06F 16/27* (2019.01); *H04L 9/3239* (2013.01);
(Continued)

(58) Field of Classification Search
CPC ..... G06Q 50/265; G06F 16/27; H04L 9/3239; H04L 2209/38; H04N 7/183; H04W 4/40
(Continued)

(56) References Cited

U.S. PATENT DOCUMENTS 9,298,806 B1   3/2016  Vessenes et al.
2017/0140375 A1  5/2017  Kunstel
(Continued)

OTHER PUBLICATIONS

Anonymous: "hyperledger-fabricdocs Documentation", Mar. 6, 2018, XP055577057,Retrieved from the Internet: URL:https://buildmedia.readthedocs.org/med ia/pdf/nick-fabric/latest/nick-fabric.pdf [retrieved on Apr. 3, 2019] p. 1-p. 32.
(Continued)

*Primary Examiner* — Jonathan P Ouellette
(74) *Attorney, Agent, or Firm* — Daniel R. Bestor

(57) ABSTRACT

A computer apparatus, such as a validator node, for validating data records in a distributed electronic ledger may be configured to receive a proposed data record submitted by an originating agent of an originating agency to a distributed ledger. In response to the proposed incident-related data record, other agents within the originating agency may, based on validation criteria, submit one or more responsive data records that may provide information for use in determining a validity of the proposed incident-related data record. Validator nodes hosted by external agencies may submit validation responses relative to a validity of the proposed incident-related data record. The system may determine that the proposed data record is valid. Based a consensus algorithm, the system may responsively append the proposed data record or an indication of validity to the distributed ledger or to a different distributed ledger.

26 Claims, 8 Drawing Sheets

(51) Int. Cl.
    *G06Q 40/08*     (2012.01)
    *G06Q 10/08*     (2012.01)
    *G06Q 50/26*     (2012.01)
    *G06F 16/27*     (2019.01)
    *H04L 9/32*     (2006.01)
    *H04N 7/18*     (2006.01)
    *H04W 4/40*     (2018.01)

(52) U.S. Cl.
    CPC .......... *H04L 2209/38* (2013.01); *H04N 7/183* (2013.01); *H04W 4/40* (2018.02)

(58) Field of Classification Search
    USPC .................................................. 705/1.1–912
    See application file for complete search history.

(56) References Cited

U.S. PATENT DOCUMENTS

| | | |
|---|---|---|
| 2017/0243212 A1 | 8/2017 | Castinado et al. |
| 2018/0018723 A1 | 1/2018 | Nagla et al. |
| 2018/0060496 A1* | 3/2018 | Bulleit .................. H04L 9/3239 |
| 2019/0109713 A1* | 4/2019 | Clark ...................... G06Q 20/36 |
| 2019/0188706 A1* | 6/2019 | McCurtis ................ G06Q 20/40 |
| 2019/0207751 A1* | 7/2019 | Harvey ................. H04L 9/0643 |
| 2019/0279227 A1* | 9/2019 | Chantz .................... H04W 4/44 |

OTHER PUBLICATIONS

The International Search Report and the Written Opinion corresponding patent application No. PCT/US2019/018509 filed Feb. 19, 2019, all pages.

\* cited by examiner

US 10,796,393 B2

SYSTEM FOR VALIDATING AND APPENDING INCIDENT-RELATED DATA RECORDS IN AN INTER-AGENCY DISTRIBUTED ELECTRONIC LEDGER

BACKGROUND OF THE INVENTION

As the data storage needs of agencies increases over time, the agencies may utilize centralized databases to store and manage data. That said, conventional database systems may pose numerous technical challenges from a data management perspective. For example, the data stored on individual databases may be vulnerable to data corruption, loss, and/or modification. If the database on which the data is stored suffers a failure or an attack, it may be difficult to recover the original, unmodified data. In some instances, it may be difficult for the agency to determine whether said data has been modified. Furthermore, centralized databases may serve as a single point of failure, such that corruption or unavailability of the centralized database may prevent the other computing devices within the agency's system from fully accessing data therein. Accordingly, there is a need for a more secure and resilient system for validating, storing, and managing incident-related data.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
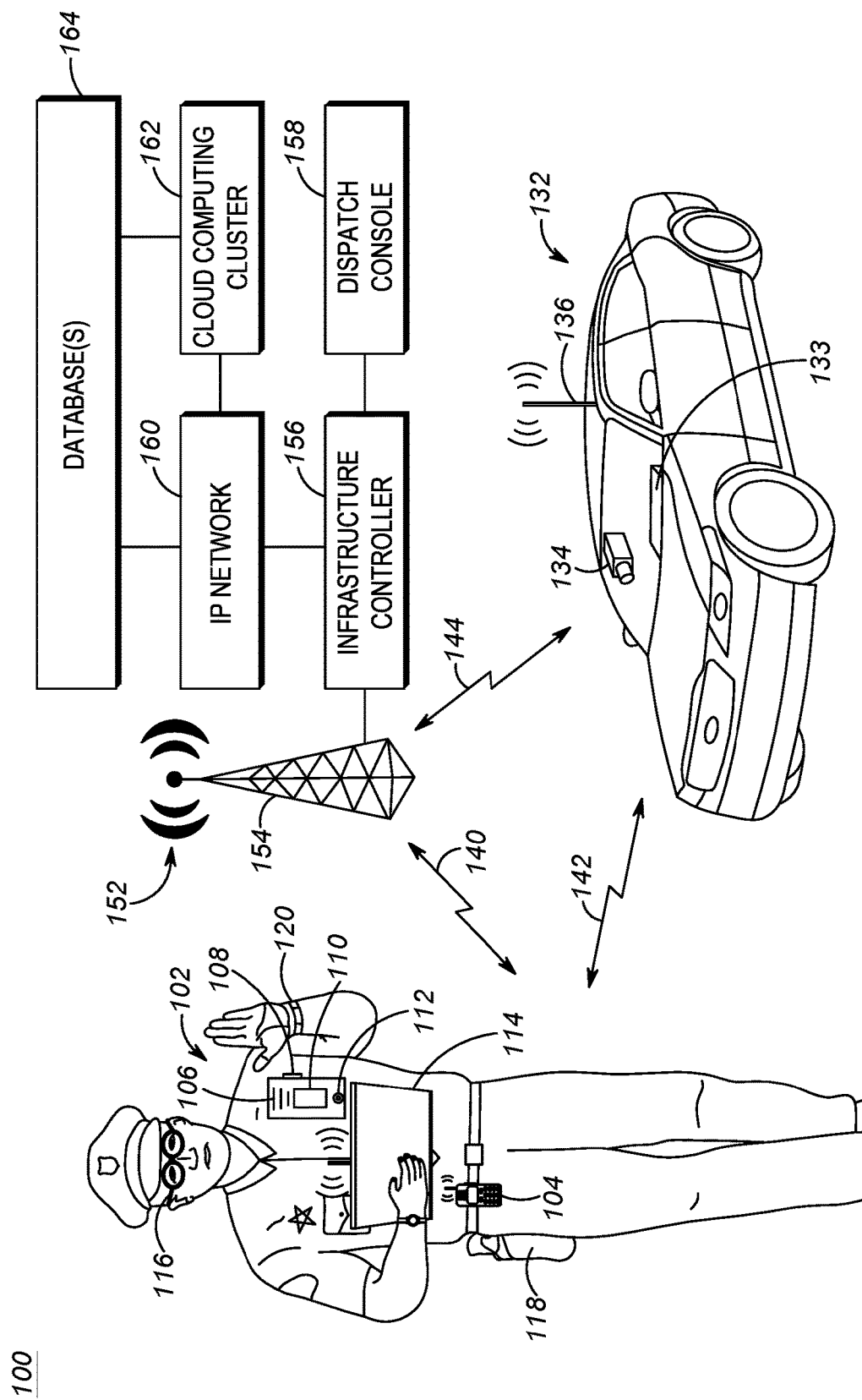
FIG. 1 is a system diagram illustrating a system for collecting incident-related data for validation and storage into an inter-agency distributed ledger, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Enterprise and Government agencies that utilize traditional centralized databases to manage their agency, personnel, incident, or other types of data records may face a number of technical challenges. For instance, storing an agency's data on a centralized database may open the data to issues of a single point of failure, such that agency devices may not be able to access the agency's data in the event of data loss, corruption, improper modification, server unavailability, and the like. A centralized database may be problematic when multiple separate agencies utilize a centralized database to manage data records; if one of the agencies becomes compromised as a result of a software bug, computer virus, malicious activity, or the like that causes the data to become corrupted or modified, the other agencies may not reliably be able to detect that such modification has occurred and further be unable to fully recover the original data. Accordingly, there is a need for an improved technically resilient and secure way to validate, store, and manage agency, personnel, incident, or other types of data records, particularly across multiple agencies.

A first embodiment is directed to a computer apparatus for validating and appending incident-related data records in an inter-agency distributed electronic ledger. The computer apparatus comprises a communication interface; one or more processors; and a memory having executable code stored therein. The executable code, when executed by the processor, causes the processor to: receive a proposed incident-related data record submitted by an originating agent of an originating agency to the inter-agency distributed electronic ledger; receive one or more responsive data records submitted by one or more second agents of the originating agency, wherein the responsive data records are associated with the proposed incident-related data record and provide responsive information relative to the proposed incident-related data record for use in determining a validity of the proposed incident-related data record; receive one or more validation responses submitted by one or more validator nodes, wherein each of the one or more validation responses set forth a response relative to a validity of the proposed incident-related data record, wherein at least one of the one or more validator nodes is operated by an external agency other than the originating agency; determine that the proposed incident-related data record is valid; and based on a consensus algorithm, responsively append one of: (i) the proposed incident-related data record to one of the inter-agency distributed electronic ledger associated with the incident and a second inter-agency distributed electronic ledger associated with the incident and (ii) an indication of validity to one of the inter-agency distributed electronic ledger associated with the incident and the second inter-agency distributed electronic ledger associated with the incident referencing the proposed incident-related data record already appended to the one of the inter-agency distributed electronic ledger associated with the incident and the second inter-agency distributed electronic ledger associated with the incident.

In a first aspect of the first embodiment, determining that the proposed data record is valid is determined using a set of inter-agency validation criteria, wherein the set of inter-agency validation criteria is a part of the consensus algorithm, wherein the one or more validation responses are votes as to the validity of the proposed incident-related data record based on the set of inter-agency validation criteria, wherein the set of inter-agency validation criteria defines that the validity of the proposed incident-related data record is determined as a function of a content of the proposed incident-related data record and the one or more responsive data records.

In a second aspect of the first embodiment, either alone or in combination with any other aspect of the first embodiment, determining that the proposed data record is valid is determined using a set of inter-agency validation criteria, wherein the set of inter-agency validation criteria is stored in one of chaincode and a smart contract separate from the consensus algorithm, wherein the one or more validation responses indicate that the one of the chaincode and the smart contract have been correctly executed.

In a third aspect of the first embodiment, either alone or in combination with any other aspect of the first embodiment, the proposed incident-related data record is appended to the inter-agency distributed electronic ledger in response to determining that the proposed incident-related data record is valid.

In a fourth aspect of the first embodiment, either alone or in combination with any other aspect of the first embodiment, the proposed incident-related data record is appended to the second inter-agency distributed electronic ledger in response to determining that the proposed incident-related data record is valid.

In a fifth aspect of the first embodiment, either alone or in combination with any other aspect of the first embodiment, the proposed data record is appended to the inter-agency distributed electronic ledger regardless of whether the proposed incident-related data record is valid and the indication of validity referencing the proposed incident-related data record is appended to the one of the inter-agency distributed electronic ledger associated with the incident and the second inter-agency distributed electronic ledger associated with the incident.

In a sixth aspect of the first embodiment, either alone or in combination with any other aspect of the first embodiment, determining that the proposed incident-related data record is valid is based at least partially on the one or more validation responses submitted by the one or more validator nodes.

In a seventh aspect of the first embodiment, either alone or in combination with any other aspect of the first embodiment, the executable code, when executed by the one or more processors, causes the one or more processors to receive a validation response submitted by an intra-agency validator node operated by the originating agency, wherein determining that the proposed incident-related data record is valid is based at least partially on the validation response submitted by the intra-agency validator node.

In an eighth aspect of the first embodiment, either alone or in combination with any other aspect of the first embodiment, determining that the proposed incident-related data record is valid is based at least partially on a trust factor associated with the originating agent or the one or more second agents.

In a ninth aspect of the first embodiment, either alone or in combination with any other aspect of the first embodiment, determining that the proposed data record is valid is based at least partially on one or more attributes of the originating agent and/or of the one or more second agents, wherein the one or more attributes of the originating agent and/or of the one or more second agents are contained in one or more data records stored on one of the inter-agency distributed electronic ledger, the second inter-agency distributed electronic ledger, an on-premises server, and a cloud-based data store.

In a tenth aspect of the first embodiment, either alone or in combination with any other aspect of the first embodiment, determining that the proposed incident-related data record is valid is based at least partially on one or more attributes of the incident.

In an eleventh aspect of the first embodiment, either alone or in combination with any other aspect of the first embodiment, the executable code, when executed by the one or more processors, causes the one or more processors to determine that the one or more responsive data records are valid; and append the one or more responsive data records to the inter-agency distributed electronic ledger.

In a twelfth aspect of the first embodiment, either alone or in combination with any other aspect of the first embodiment, the executable code, when executed by the one or more processors, causes the one or more processors to receive an automated responsive data record from an automated agent, wherein the automated responsive data record indicates whether the automated agent has determined that the proposed incident-related data record satisfies intra-agency validation criteria.

In a thirteenth aspect of the first embodiment, either alone or in combination with any other aspect of the first embodiment, the distributed electronic ledger is a blockchain, wherein determining that the proposed incident-related data record is valid is based at least partially on one or more attributes of the originating agent, of the one or more second agents, and/or of the incident, wherein the one or more attributes of the originating agent, of the one or more second agents, and/or of the incident are contained in one or more previous blocks of the blockchain; and wherein the proposed incident-related data record is appended to a new block of the blockchain.

In a fourteenth aspect of the first embodiment, either alone or in combination with any other aspect of the first embodiment, the distributed electronic ledger is a permissioned blockchain, wherein the originating agent is authorized to submit proposed incident-related data records to the permissioned blockchain, wherein the one or more second agents associated with the originating agency are authorized to submit responsive data records to the permissioned blockchain, and wherein the one or more validator nodes are authorized to submit validation responses to the permissioned blockchain. The one or more validator nodes may not be authorized to propose incident-related data records.

In a fifteenth aspect of the first embodiment, either alone or in combination with any other aspect of the first embodiment, receiving the proposed incident-related data record submitted by an originating agent of an originating agency comprises receiving the proposed incident-related data record from a police officer or dispatcher of a police agency, wherein the proposed incident-related data record is associated with a public safety incident, wherein the proposed incident-related data record comprises electronic evidence associated with the public safety incident, metadata of physical evidence associated with the public safety incident, a request to assign the police officer to the public safety incident, a request to update the status of the public safety incident, a location of the public safety incident, or a jurisdiction of the public safety incident; receiving one or more responsive data records submitted by one or more second agents comprises receiving one or more responsive data records comprising the responsive information from one or more second police officers, wherein the responsive information comprises one or more indications that the one or more second police officers have approved the proposed incident-related data record; and determining that the proposed incident-related data record is valid comprises executing one or more validation checks, the one or more validation checks comprising determining that the police officer is currently assigned to the public safety incident, that the location of the police officer is within a threshold distance from the location of the incident, that a role of the police officer is appropriate for the public safety incident, that the police officer is associated with a digital trust factor above a specified threshold, or that the police officer has not been assigned to another incident.

In a sixteenth aspect of the first embodiment, either alone or in combination with any other aspect of the first embodiment, the proposed incident-related data record comprises (i) a pointer to a digital file stored in an electronic database and (ii) a digital fingerprint of the digital file.

A second embodiment is directed to a computer program product for validating and appending incident-related data records in an inter-agency distributed electronic ledger, the computer program product comprising at least one non-transitory computer readable medium having computer-readable program code portions embodied therein, the computer-readable program code portions comprising an executable portion for receiving, via a computer apparatus, a proposed incident-related data record submitted by an originating agent of an originating agency to the inter-agency distributed electronic ledger; an executable portion for receiving, via the computer apparatus, one or more responsive data records submitted by one or more second agents of the originating agency, wherein the responsive data records are associated with the proposed incident-related data record and provide responsive information relative to the proposed incident-related data record for use in determining a validity of the proposed incident-related data record; an executable portion for receiving, via the computer apparatus, one or more validation responses submitted by one or more validator nodes, wherein each of the one or more validation responses set forth a response relative to a validity of the proposed incident-related data record, wherein at least one of the one or more validator nodes is operated by an external agency other than the originating agency; an executable portion for determining that the proposed incident-related data record is valid; and an executable portion for, based on a consensus algorithm, responsively appending, via the computer apparatus, one of: (i) the proposed incident-related data record to one of the inter-agency distributed electronic ledger associated with the incident and a second inter-agency distributed electronic ledger associated with the incident and (ii) an indication of validity to one of the inter-agency distributed electronic ledger associated with the incident and the second inter-agency distributed electronic ledger associated with the incident referencing the proposed incident-related data record already appended to the one of the inter-agency distributed electronic ledger associated with the incident and the second inter-agency distributed electronic ledger associated with the incident.

A third embodiment is directed to a computer-implemented method for validating and appending incident-related data records in an inter-agency distributed electronic ledger, the method comprising receiving, via a computer apparatus, a proposed incident-related data record submitted by an originating agent of an originating agency to the inter-agency distributed electronic ledger; receiving, via the computer apparatus, one or more responsive data records submitted by one or more second agents of the originating agency, wherein the responsive data records are associated with the proposed incident-related data record and provide responsive information relative to the proposed incident-related data record for use in determining a validity of the proposed incident-related data record; receiving, via the computer apparatus, one or more validation responses submitted by one or more validator nodes, wherein each of the one or more validation responses set forth a response relative to a validity of the proposed incident-related data record, wherein at least one of the one or more validator nodes is operated by an external agency other than the originating agency; determining, via the computer apparatus, that the proposed incident-related data record is valid; and based on a consensus algorithm, responsively appending, via the computer apparatus, one of: (i) the proposed incident-related data record to one of the inter-agency distributed electronic ledger associated with the incident and a second inter-agency distributed electronic ledger associated with the incident and (ii) an indication of validity to one of the inter-agency distributed electronic ledger associated with the incident and the second inter-agency distributed electronic ledger associated with the incident referencing the proposed incident-related data record already appended to the one of the inter-agency distributed electronic ledger associated with the incident and the second inter-agency distributed electronic ledger associated with the incident.

In a first aspect of the third embodiment, the method further comprises determining that the proposed incident-related data record is valid based on a set of inter-agency validation criteria, wherein the set of inter-agency validation criteria is a part of the consensus algorithm, wherein the one or more validation responses are votes as to the validity of the proposed incident-related data record based on the set of inter-agency validation criteria, wherein the set of inter-agency validation criteria defines that the validity of the proposed incident-related data record is determined as a function of a content of the proposed incident-related data record and the one or more responsive data records.

In a second aspect of the third embodiment, either alone or in combination with any other aspect of the third embodiment, the method further comprises receiving an automated responsive data record from an automated agent, wherein the automated responsive data record indicates whether the automated agent has determined that the proposed incident-related data record satisfies intra-agency validation criteria. The automated agent may be configured to determine whether the proposed incident-related data record satisfies the intra-agency validation criteria based on one or more attributes of the originating agent. The automated agent may be configured to determine whether the proposed data record satisfies the intra-agency validation criteria based at least partially on one or more attributes of the incident. The automated agent may configured to determine whether the proposed incident-related data record satisfies the intra-agency validation criteria based at least partially on private intra-agency information of the originating agency In a third aspect of the third embodiment, either alone or in combination with any other aspect of the third embodiment, the proposed incident-related data record comprises (i) a pointer to a digital file stored in an electronic database and (ii) a digital fingerprint of the digital file.

Each of the above-mentioned embodiments will be discussed in more detail below. Section 1 describes an exemplary communication system and device architectures. Section 2 describes a general distributed ledger system, processes, and data structures that may be found therein. Section 3 describes the inter-agency distributed ledger system's operating environment, layout, and processes in further detail relative to incident-related (and other) data records. Further advantages and features consistent with this disclosure will be set forth in the following detailed description, with reference to the figures.

1. COMMUNICATION DEVICES AND DEVICE STRUCTURES a. Communication Devices

The invention as described herein may be configured to receive data from a number of different communication devices for storage into the distributed ledger system. In particular, an agency's responders may utilize a number of different communication devices to collect incident data and/or upload such incident data (e.g., video/audio/image files, text or document files, etc.) to the distributed ledger system. Furthermore, some of the communication devices as described herein may serve as nodes of the distributed ledger, terminal client devices within the agency's systems, database systems, and the like. A more detailed description of examples of such communication devices follows. The below example is within the context of a first responder system, such as a police department, EMT or fire department. The following is given as an example and it is understood that the communication devices may be any form of device used in any context where communication devices are used to provide information about an incident.

Figure 2:
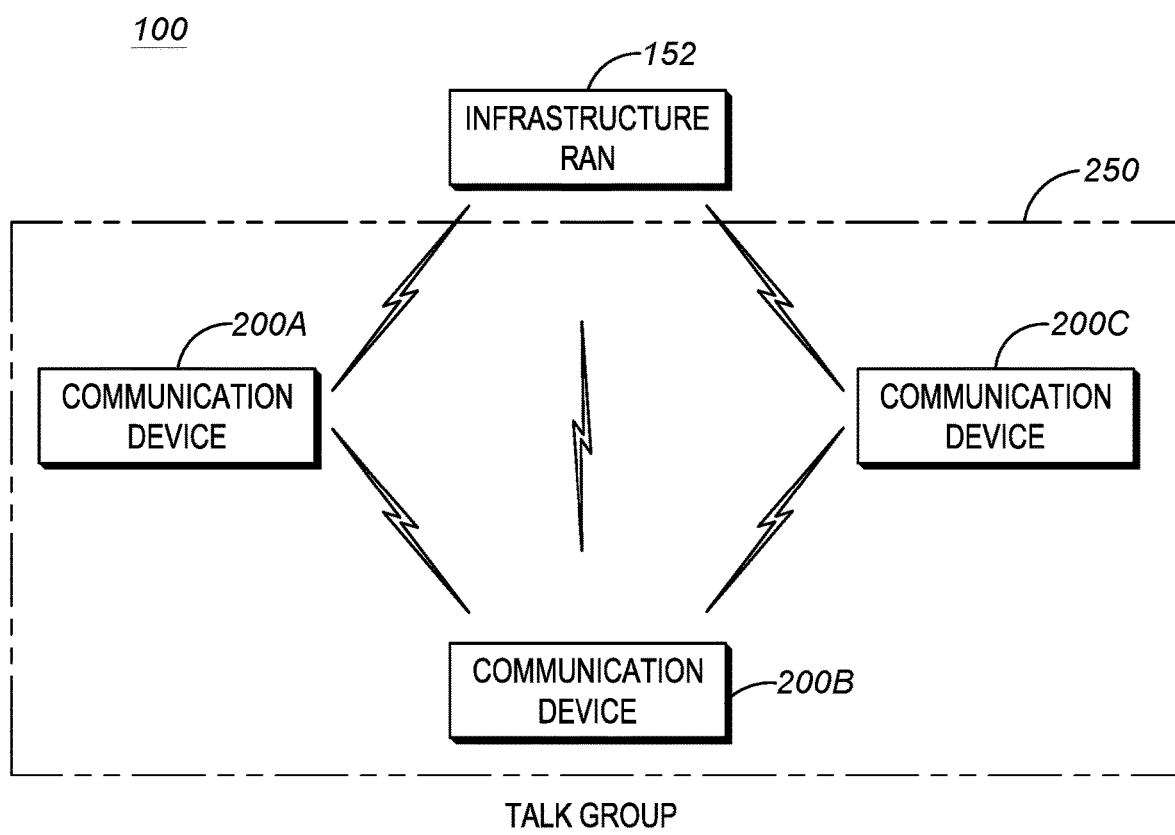
FIG. 2 is a system diagram illustrating a plurality of devices of FIG. 1, in accordance with some embodiments.

Referring now to the drawings, and in particular FIGS. 1 and 2, a set of communication devices 200 within the communication system 100 is shown including a first set of devices that a user 102 (illustrated in FIG. 1 as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (for example, which may be virtual reality, augmented reality, or mixed reality glasses), sensor-enabled holster 118, and/or biometric sensor wristband 120. Although FIG. 1 illustrates only a single user 102 with a respective first set of devices, in other embodiments, the single user 102 may include additional sets of same or similar devices, and additional users may be present with respective additional sets of same or similar devices as indicated by FIG. 2.

System 100 may also include a vehicle 132 associated with the user 102 having an integrated mobile communication device 133, an associated vehicular video camera 134, and a coupled vehicular transceiver 136. Although FIG. 1 illustrates only a single vehicle 132 with a single mobile communication device 133, respective single vehicular video camera 134 and/or microphone, and a single coupled vehicular transceiver 136, in other embodiments, the vehicle 132 may include additional same or similar mobile communication devices, video cameras, microphones, and/or transceivers, and additional vehicles may be present with respective additional sets of mobile communication devices, video cameras, microphones, and/or transceivers.

Each of the portable radio 104, RSM video capture device 106, laptop 114, and vehicular mobile communication device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices are configured to receive inputs associated with the user 102 and/or provide outputs to the user 102 in addition to communicating information to and from other communication devices and the infrastructure RAN 152.

Many of the devices shown in FIG. 1 (such as the portable radio 104, the RSM video capture device 106, the laptop 114, the mobile communication device 133, the infrastructure controller 156, dispatch console 158, and one or more computing devices in the cloud computing cluster 162) may be referred to as communication devices (for example, communication devices 200A, 200B, 200C shown in FIG. 2). Although FIG. 1 shows multiple communication devices 200 associated with the user 102, in some embodiments, the communication system 100 includes communication devices 200 of multiple users. For example, as shown in FIG. 2, the communication device 200A is associated with a first user, the communication device 200B is associated with a second user, and the communication device 200C is associated with a third user. Further, as shown in FIG. 2, the communication devices 200A, 200B, and 200C are members of the same talk group i.e., talk group 250. Although not shown in FIG. 2, each of the communication devices 200A, 200B, 200C may also be associated with one or more talk groups other than the talk group 250. The communication devices 200A, 200B, 200C will be interchangeably referred to hereafter, collectively, as communication devices 200 or device 200, and generically as a communication device 200 or device 200. In some embodiments, the communication devices 200 communicate with each other over the infrastructure RAN 152 and/or communicate with each other directly as described herein. Similarly, other devices, such as the dispatch console 158, may communicate with communication devices 200 of multiple users through the infrastructure RAN 152. In some embodiments, one or more users may have multiple associated communication devices 200, for example, as shown in FIG. 1.

Referring back to FIG. 1, the portable radio 104, in particular, may be any communication device 200 used for infrastructure RAN or direct-mode media (for example, voice, audio, video, etc.) communication via a long-range wireless transmitter and/or transceiver that has a transmitter transmit range on the order of miles, for example, 0.5-50 miles, or 3-20 miles (for example, in comparison to a short-range transmitter such as a Bluetooth, Zigbee, or NFC transmitter) with other communication devices and/or the infrastructure RAN 152. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter may implement a Wi-Fi protocol perhaps in accordance with an IEEE 802.11 standard (for example, 802.11a, 802.11b, 802.11g) or a WiMAX protocol perhaps operating in accordance with an IEEE 802.16 standard.

In the example of FIG. 1, the portable radio 104 may form the hub of communication connectivity for the user 102, through which other accessory devices, such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple.

In order to communicate with and exchange video, audio, and other media and communications with the RSM video capture device 106, laptop 114, and/or smart glasses 116, the portable radio 104 may contain one or more physical electronic ports (such as a universal serial bus (USB) port, an Ethernet port, an audio jack, etc.) for direct electronic coupling with the RSM video capture device 106, laptop 114, and/or smart glasses 116. In some embodiments, the portable radio 104 may contain a short-range transmitter (for example, in comparison to the long-range transmitter such as a LMR or Broadband transmitter) and/or transceiver for wirelessly coupling with the RSM video capture device 106, laptop 114, and/or smart glasses 116. The short-range transmitter may be a Bluetooth, Zigbee, or near field communication (NFC) transmitter having a transmit range on the order of 0.01-100 meters, or 0.1-10 meters. In other embodiments, the RSM video capture device 106, the laptop 114, and/or the smart glasses 116 may contain their own long-range transceivers and may communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch/interface or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and that switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture (such as a talk group 250 shown in FIG. 2) that allows a single communication device to communicate with one or more group members (not shown) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone may be used, for example, for capturing audio and/or video of a field-of-view associated with the user 102, perhaps including a suspect and the suspect's surroundings, storing the captured image and/or audio data for further analysis or transmitting the captured audio and/or video data as an audio and/or video stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones that may be capable of identifying a direction from which a captured sound emanated.

In some embodiments, the RSM video capture device 106 may be replaced with a more limited body worn camera that may include the video camera 112 and/or microphone noted above for capturing audio and/or video, but may forego one or more of the features noted above that transform the body worn camera into a more full featured RSM, such as the separate physical PTT switch 108 and the display screen 110, and remote microphone functionality for voice communications in cooperation with portable radio 104.

The laptop 114, in particular, may be any wireless communication device used for infrastructure RAN or direct-mode media communication via a long-range or short-range wireless transmitter with other communication devices and/or the infrastructure RAN 152. The laptop 114 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 114 display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may also be provided at the laptop 114, integrating an ability to capture video and/or audio of the user 102 and the user's 102 surroundings, perhaps including a field-of-view of the user 102 and/or a suspect (or potential suspect) and the suspect's surroundings, and store and/or otherwise process the captured video and/or audio for further analysis or transmit the captured video and/or audio as a video and/or audio stream to the portable radio 104, other communication devices, and/or the infrastructure RAN 152 for further analysis.

The smart glasses 116 may include a digital imaging device, an electronic processor, a short-range and/or long-range transceiver device, and/or a projecting device. The smart glasses 116 may maintain a bi-directional connection with the portable radio 104 and provide an always-on or on-demand video feed pointed in a direction of the user's 102 gaze via the digital imaging device, and/or may provide a personal display via the projection device integrated into the smart glasses 116 for displaying information such as text, images, or video received from the portable radio 104 or directly from the infrastructure RAN 152. In some embodiments, the smart glasses 116 may include its own long-range transceiver and may communicate with other communication devices and/or with the infrastructure RAN 152 or vehicular transceiver 136 directly without passing through portable radio 104. In some embodiments, an additional user interface mechanism such as a touch interface or gesture detection mechanism may be provided at the smart glasses 116 that allows the user 102 to interact with the display elements displayed on the smart glasses 116 or projected into the user's 102 eyes, or to modify operation of the digital imaging device. In other embodiments, a display and input interface at the portable radio 104 may be provided for interacting with smart glasses 116 content and modifying operation of the digital imaging device, among other possibilities.

The smart glasses 116 may provide a virtual reality interface in which a computer-simulated reality electronically replicates an environment with which the user 102 may interact. In some embodiments, the smart glasses 116 may provide an augmented reality interface in which a direct or indirect view of real-world environments in which the user is currently disposed are augmented (that is, supplemented, by additional computer-generated sensory input such as sound, video, images, graphics, GPS data, or other information). In still other embodiments, the smart glasses 116 may provide a mixed reality interface in which electronically generated objects are inserted in a direct or indirect view of real-world environments in a manner such that they may co-exist and interact in real time with the real-world environment and real world objects.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. In some embodiments, a weapon of the user 102 may include a sensor that detects when the weapon is discharged. The detected discharge may be reported to the portable radio 104, for example. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 120 itself, or disposed separately and communicate with the sensor wristband 120 via a short range wireless or wired connection. The breathing rate sensor may include use of differential capacitive circuits or capacitive transducers to measure chest displacement and thus breathing rates. In other embodiments, a breathing sensor may monitor a periodicity of mouth and/or nose-exhaled air (for example, using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1 as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor. In some embodiments, the biometric sensor wristband 120 or another device of the user 102 may detect characteristics of the environment of the user 102 (for example, temperature, humidity, air quality, and the like).

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, Bluetooth Low Energy, WiFi, Near Field Communication (NFC), Radio Frequency ID (RFID) or other short-range wireless protocol having a transmission range on the order of meters, tens of meters, or hundreds of meters.

The portable radio 104 and/or RSM video capture device 106 (or any other device in FIG. 1, for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 102 may include the mobile communication device 133, the vehicular video camera 134 and/or microphone, and the vehicular transceiver 136, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with communication devices such as the portable radio 104, the RSM 106, and the laptop 114 via wireless link(s) 142 and/or for wirelessly communicating with the RAN 152 via wireless link(s) 144. The vehicular transceiver 136 may further include a short-range wireless transceiver or wired transceiver for communicatively coupling between the mobile communication device 133 and/or the vehicular video camera 134 in the VAN. The mobile communication device 133 may, in some embodiments, include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other communication devices, and/or the infrastructure RAN 152 for further analysis. A microphone (not shown), or an array thereof, may be integrated in the video camera 134 and/or at the mobile communication device 133 (or additionally or alternatively made available at a separate location of the vehicle 132) and communicatively coupled to the mobile communication device 133 and/or vehicular transceiver 136 for capturing audio and storing, processing, and/or transmitting the audio in a same or similar manner to the video as set forth above. The omni-directional or uni-directional microphone, or an array thereof, may be integrated in the video camera 134 and/or at the mobile communication device 133 (or additionally or alternatively made available at a separate location of the vehicle 132) and communicably coupled to the mobile communication device 133 and/or vehicular transceiver 136 for capturing audio and storing, processing, and/or transmitting the audio in a same or similar manner as set forth above with respect to the RSM 106.

The vehicle 132 may be a human-operable vehicle, or may be a self-driving vehicle operable under control of the mobile communication device 133 perhaps in cooperation with video camera 134 (that may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link). In some embodiments, devices within the vehicle 132 may communicate with devices in other vehicles via a Vehicular to Vehicular (V2V) Network.

The vehicle 132 and/or transceiver 136, similar to the portable radio 104 and/or respective receivers, transmitters, or transceivers thereof, may include a location (and/or orientation) determination device integrated with or separately disposed in the mobile communication device 133 and/or transceiver 136 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above may be disposed, and may similarly communicate with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between. In some embodiments, one of the VAN and the PAN may provide infrastructure communications to the other, depending on the situation and the types of devices in the VAN and/or PAN and may provide interoperability and communication links between devices (such as video cameras) and sensors within the VAN and PAN.

Although the RSM 106, the laptop 114, and the vehicle 132 are illustrated in FIG. 1 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

In some embodiments, one or more of the user 102, the vehicle 132, the portable radio 104, the RSM video capture device 106, and any other device in FIG. 1 may be equipped with an environmental sensor such as a chemical, biological, radiological, nuclear, or explosive (CBRNE) sensor. Measurements made by the CBRNE sensor may be stored locally or transmitted via a transmitter or transceiver to other communication devices and/or to the infrastructure RAN 152.

Infrastructure RAN 152 is a radio access network that provides for radio communication links to be arranged within the network between a plurality of communication devices. Such communication devices may be portable, mobile, or stationary and may include any one or more of the communication devices illustrated in FIG. 1, among other possibilities. At least one other terminal, for example used in conjunction with the communication devices, may be a fixed terminal, for example a base station, eNodeB, repeater, and/or access point. Such a RAN may include a system infrastructure that generally includes a network of various fixed terminals, which are in direct radio communication with the communication devices. Each of the fixed terminals operating in the RAN 152 may have one or more transceivers that may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN 152 are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 may implement a wireless local area network (WLAN) technology such as Wi-Fi perhaps operating in accordance with an IEEE 802.11 standard (for example, 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency division multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server (also referred to as a talk group server) that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (for example, together that form an auditory data stream over time), such as according to RTP and internet protocols (IP), to the PTT server. The PTT server then transmits the auditory data packets to other users of the PoC session (for example, to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (for example, talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (for example, communication devices) could be provisioned in the network by the user or an agent, and then provided some form of group identity or identifier, for example. Then, at a future time, an originating user in a group may cause some signaling to be transmitted indicating that he or she wishes to establish a communication session (for example, group call) with each of the pre-designated participants in the defined group. In another example, communication devices may dynamically affiliate with a group (and also disassociate with the group) perhaps based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1, such a middleware server may be disposed in infrastructure RAN 152 at infrastructure controller 156 or at a separate cloud computing cluster 162 communicably coupled to infrastructure controller 156 via internet protocol (IP) network 160, among other possibilities.

The infrastructure RAN 152 is illustrated in FIG. 1 as providing coverage for the portable radio 104, RSM video capture device 106, laptop 114, smart glasses 116, and/or vehicle transceiver 136 via a single fixed terminal 154 coupled to a single infrastructure controller 156 (for example, a radio controller, call controller, PTT server, zone controller, MME, BSC, MSC, site controller, Push-to-Talk controller, or other network device) and including the dispatch console 158 operated by a dispatcher. In other embodiments, additional fixed terminals and additional controllers may be disposed to support a larger geographic footprint and/or a larger number of mobile devices.

The infrastructure controller 156 illustrated in FIG. 1, or some other back-end infrastructure device or combination of back-end infrastructure devices existing on-premises or in the remote cloud computing cluster 162 accessible via the IP network 160 (such as the Internet), may additionally or alternatively operate as a back-end electronic digital assistant, a back-end audio and/or video processing device, a back-end node in a distributed ledger, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud computing cluster 162 may be comprised of a plurality of computing devices, such as the one set forth in FIG. 2, one or more of which may be executing none, all, or a portion of an electronic digital assistant service or back-end distributed ledger node, sequentially or in parallel, across the one or more computing devices. The one or more computing devices comprising the cloud computing cluster 162 may be geographically co-located or may be separated by inches, meters, or miles, and inter-connected via electronic and/or optical interconnects.

As shown in FIG. 1, database(s) 164 may be accessible via the IP network 160 and/or the cloud computing cluster 162. As shown in FIG. 1, the databases 164 are communicatively coupled with the infrastructure RAN 152 to allow the communication devices (for example, the portable radio 104, the RSM video capture device 106, the laptop 114, and the mobile communication device 133) to communicate with, retrieve data from, and store data in the databases 164 via infrastructure controller 156 and IP network 160. In some embodiments, the databases 164 may comprise the inter-agency distributed electronic ledger. In this regard, copies of the inter-agency distributed electronic ledger may be stored on multiple devices and systems, which may be operated by multiple agencies. In some embodiments, the databases 164 are commercial cloud-based storage devices. In some embodiments, the databases 164 are housed on suitable on-premises database servers.

The database(s) may include databases such as a long-term video storage database, a historical or forecasted weather database, an offender database perhaps including facial recognition images to match against, a cartographic database of streets and elevations, a traffic database of historical or current traffic conditions, incident database including data such as incident assignment and timeline of incidents, or other types of databases. The databases may include metadata and other information about physical evidence located in physical storage. In a particular embodiment, the databases 164 may include an inter-agency distributed electronic ledger that is used to store records related to incidents, agents and other transactions. Such inter-agency distributed electronic ledger may be linked to other databases (e.g., long-term video and image storage database) that may contain files related to incident/transaction records. Databases 164 may further include all or a portion of the databases described herein as being provided at the infrastructure controller 156. In some embodiments, the databases 164 (or a subset of such databases) may be maintained by third parties (for example, the National Weather Service or a Department of Transportation, respectively). The databases 164 of FIG. 1 are merely examples. In some embodiments, the system 100 additionally or alternatively includes other databases that store different information. In some embodiments, the databases 164 and/or additional or other databases are integrated with, or internal to, the infrastructure controller 156.

Finally, although FIG. 1 describes a system 100 generally as a public safety system that includes a user 102 generally described as a police officer and a vehicle 132 generally described as a police cruiser, in other embodiments, the communication system 100 may additionally or alternatively be a retail system including a user 102 that may be an employee of a retailer and a vehicle 132 that may be a vehicle for use by the user 102 in furtherance of the employee's retail duties (for example, a shuttle or self-balancing scooter). In other embodiments, the system 100 may additionally or alternatively be a warehouse system including a user 102 that may be an employee of a warehouse and a vehicle 132 that may be a vehicle for use by the user 102 in furtherance of the employee's retail duties (for example, a forklift). In still further embodiments, the system 100 may additionally or alternatively be a private security system including a user 102 that may be an employee of a private security company and a vehicle 132 that may be a vehicle for use by the user 102 in furtherance of the private security employee's duties (for example, a private security vehicle or motorcycle). In even further embodiments, the system 100 may additionally or alternatively be a medical system including a user 102 that may be a doctor or nurse of a hospital and a vehicle 132 that may be a vehicle for use by the user 102 in furtherance of the doctor or nurse's duties (for example, a medical gurney or ambulance). In still another example embodiment, the system 100 may additionally or alternatively be a heavy machinery system including a user 102 that may be a miner, driller, or extractor at a mine, oil field, or precious metal or gem field and a vehicle 132 that may be a vehicle for use by the user 102 in furtherance of the miner, driller, or extractor's duties (for example, an excavator, bulldozer, crane, front loader). In yet another example embodiment, the system 100 may be a utilities service system including a user 102 that may be a responder such as a utilities worker. Said system may further comprise devices such as a user's 102 laptop, smart device, portable video/audio capture device, a vehicle 132 for use by the user 102 in furtherance of utilities maintenance and/or incident management activities. Other possibilities exist as well.

b. Device Structure

Figure 3:
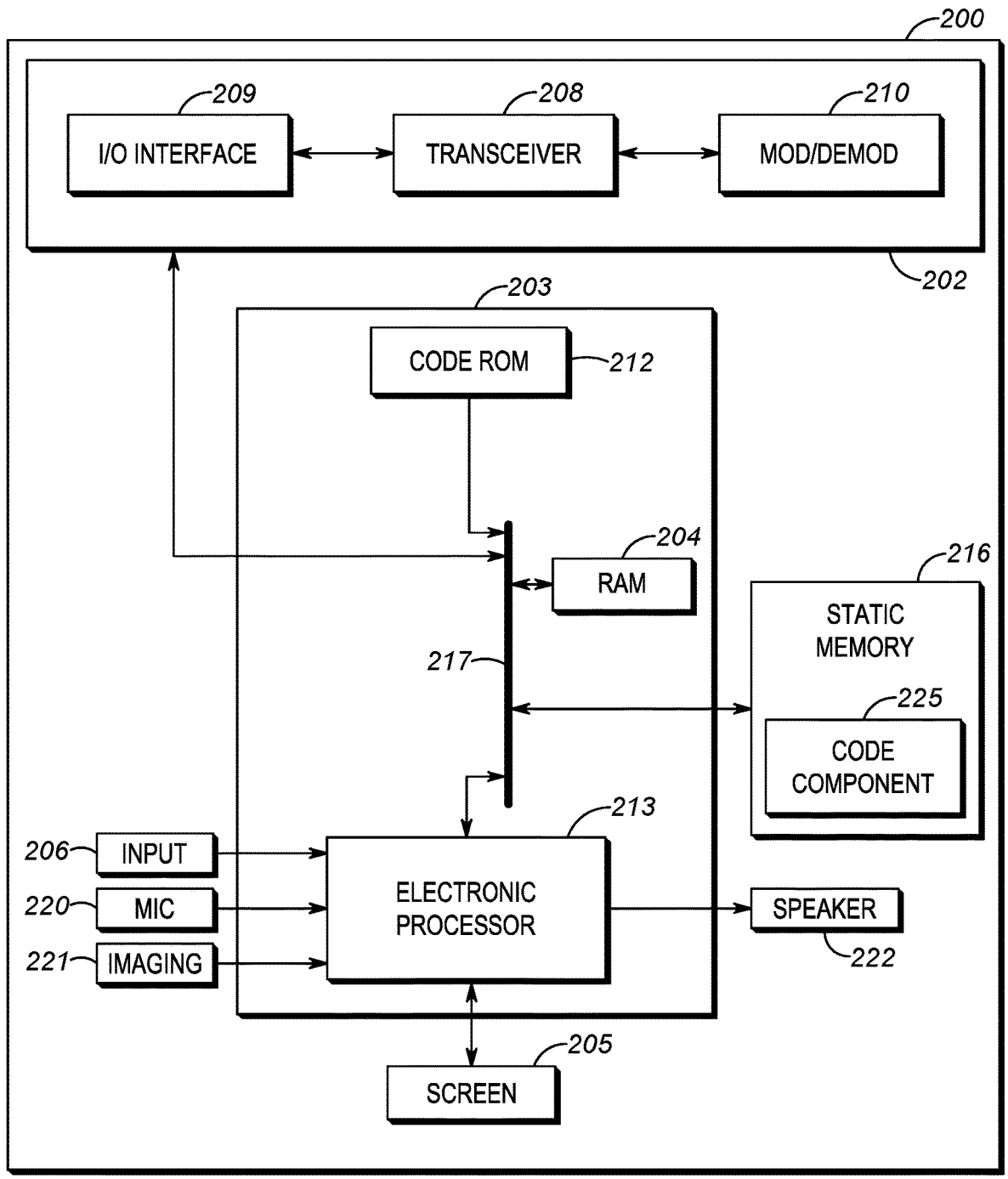
FIG. 3 is a device diagram showing a device structure of a device of the system of FIGS. 1 and 2 in accordance with some embodiments.

FIG. 3 sets forth a schematic diagram that illustrates a communication device 200 according to some embodiments of the present disclosure. The communication device 200 may be, for example, embodied in the portable radio 104, the RSM video capture device 106, the laptop 114, the mobile communication device 133, the infrastructure controller 156, the dispatch console 158, one or more computing devices in the cloud computing cluster 162, or some other communication device not illustrated in FIG. 1, and/or may be a distributed communication device across two or more of the foregoing (or multiple of a same type of one of the foregoing) and linked via a wired and/or wireless communication link(s). In some embodiments, the communication device 200 (for example, the portable radio 104) may be communicatively coupled to other devices such as the sensor-enabled holster 118 as described above. In such embodiments, the combination of the portable radio 104 and the sensor-enabled holster 118 may be considered a single communication device 200.

While FIG. 3 represents the communication devices 200 described above with respect to FIGS. 1 and 2, depending on the type of the communication device, the communication device 200 may include fewer or additional components in configurations different from that illustrated in FIG. 3. For example, in some embodiments, the communication device 200 acting as the infrastructure controller 156 may not include one or more of the screen 205, microphone 220, imaging device 221, and speaker 222. As another example, in some embodiments, the communication device 200 acting as the portable radio 104 of the RSM video capture device 106 may further include a location determination device (for example, a global positioning system (GPS) receiver) as explained above. Other combinations are possible as well.

As shown in FIG. 3, the communication device 200 includes a communications unit 202 coupled to a common data and address bus 217 of a processing unit 203. The communication device 200 may also include one or more input devices (for example, keypad, pointing device, touch-sensitive surface, button, a microphone 220, an imaging device 221, and/or another input device 206) and an electronic display screen 205 (that, in some embodiments, may be a touch screen and thus also acts as an input device), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as the portable radio 104, the laptop 114, the wireless RAN 152, and/or the mobile communication device 133.

For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the microphone 220, the imaging device 221, the other input device 206, and/or the speaker 222. Static memory 216 may store operating code 225 for the electronic processor 213 that, when executed, performs one or more of the steps set forth in FIG. 9 and the accompanying text. The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

2. DISTRIBUTED LEDGER SYSTEM AND DATA STRUCTURES

Embodiments of the present disclosure may utilize a blockchain or other distributed ledger system to store, recall, and/or validate agency, incident, personnel, or other types of data. "Distributed ledger" or "distributed electronic ledger" as used herein may refer to a structured list of data records that is decentralized and distributed amongst a plurality of computing systems and devices. In some embodiments, the distributed ledger may be a blockchain ledger or a hash calendar, among other possibilities. As noted above, the computing systems on which the distributed ledger is hosted may herein be referred to as "nodes." In particular, the nodes that perform validation of data records via a consensus algorithm may be referred to as "validator nodes." In some embodiments, each node maintains a full copy of the distributed ledger, although it is within the scope of the present disclosure for any particular node or all nodes to contain a partial copy of the distributed ledger.

"Agency" as used herein may refer to an organizational entity that may store and/or retrieve various types of data records (e.g., in the distributed ledger) related to the organization's goals, activities, resources, and the like. In some embodiments, the agency may be a private enterprise organization such as a utilities, oil/gas, electric, private security, or water company or other business. In other embodiments, the agency may be a public organization such as a public-safety agency (e.g., police, fire, etc.), government entity, and the like. "Incident" as used herein may refer to an event, occurrence, or situation that the agency has been tasked to resolve (e.g., a traffic accident, public disturbance, medical emergency, fire, broken water meter or power line, etc.).

"Incident-related data record" as used herein may refer to a data record that is associated with a particular incident or that defines valid incident types. Accordingly, incident-related data records may contain electronic evidence (e.g., video files, audio files, images, etc.), data or metadata regarding physical evidence (e.g., crime scene evidence such as a victim's shoe). Incident-related data records may further define roles, assign resources, update the status of an incident, or the like. Incident-related data records may also be used to assign attributes to the incident to indicate the nature of the incident (e.g., a chemical spill may require the attention of a chemical specialist).

If the distributed ledger is in the form of a blockchain, the blockchain may comprise a series of "blocks" that may in turn comprise data and metadata. The "data" within each block may comprise one or more "data records" or "transactions." The "metadata" within each block may comprise information about the block, such as a timestamp, a hash of data records within the block, a pointer to the previous block, and the like. In particular, the blockchain begins with a genesis block and is subsequently lengthened by appending blocks in series to the genesis block. Generally, the data within each block within the blockchain may not be modified by the nodes of the blockchain after it is added; and data may only be added through the addition of a new block after the last block in the existing blockchain. Each new block added to the blockchain may comprise a timestamp and a pointer to the previous block in the blockchain. In this way, the blockchain may provide an immutable record of data records over a period of time. In some embodiments, in order for a new block to be added to the blockchain, a pending data record or transaction may be proposed to be added to the blockchain. The nodes may then, via a "consensus algorithm" or "consensus mechanism," come to a consensus as to the contents of the data to be added in the blockchain. Once a consensus has been reached by the nodes that the pending data record is valid, the nodes append the data record to the last block in the blockchain.

In other embodiments, other forms of distributed ledgers may be used. For example, the distributed ledger may take the form of a Directed Acyclic Graph (DAG), which may be a finite graph comprising one or more directional edges and/or vertices. In such embodiments, data records may be stored in the vertices of the DAG, while the relationships may be defined using directed edges. Alternatively, the distributed ledger may take the form of a distributed hash calendar such as the Keyless Signature Infrastructure (KSI), in which each node comprises a database for which hash values are generated in fixed intervals over time.

In other embodiments, a Hashgraph may be used, which uses a "gossip" protocol to propagate information relating to new data records. Each node may propagate information to one or more receiving nodes (which may be performed at random), where the receiving nodes may aggregate the information received from other nodes and further propagate the information to other receiving nodes, until each node within the Hashgraph system becomes aware of all relevant information relating to the new data records. Other possibilities exist as well.

In a distributed ledger system, each node may maintain a validated copy of the distributed ledger such that the distributed ledger may remain accessible even if one or more nodes become unavailable (e.g., a node is offline due to maintenance, malfunction, etc.) and may further account for divergence from the true copy of the distributed ledger which may occur at the node level (e.g., a copy of the distributed ledger on a particular node becomes invalid due to data corruption, malicious editing, and the like). In other words, the consensus mechanism may ensure that, over time, each node hosts a copy of the distributed ledger that is consistent with the other nodes. In some embodiments, the distributed ledger may be either unpermissioned or permissioned, and/or either public or private. A "public" distributed ledger may refer to a distributed ledger that is accessible to any member of the public, whereas a "private" distributed ledger may refer to a distributed ledger that is accessible only to users, agents, or computing devices who meet a certain criteria (e.g., limited to employees of a particular agency or group of agencies). A "permissioned" distributed ledger may refer to a distributed ledger for which an access control mechanism is implemented such that only known, authorized users may take certain actions within the distributed ledger (e.g., add new data records, contribute to consensus), whereas an "unpermissioned" distributed ledger may refer to a distributed ledger without an access control mechanism. Accordingly, the distributed ledger may be an unpermissioned and public ledger, an unpermissioned and private ledger, a permissioned and public ledger, or a permissioned and private ledger.

If the distributed ledger is permissioned, the system may use various methods to control access to the distributed ledger. For example, the system may require users to obtain a stake in a digital currency or point system in order to validate transactions (e.g., a "proof of stake" mechanism). In other embodiments, digital certificates may be provided to authorized nodes within the system, such as by using a Membership Service Provider (MSP) with Hyperledger Fabric. By using the digital certificates, the nodes may authenticate one another to ensure that the nodes are authorized to submit proposed data records and/or participate in the consensus mechanism. In other embodiments, access control may be implemented using smart contracts or chaincode that contain validation check mechanisms (e.g., on an Ethereum network).

"Smart contract" or "chaincode" as used herein may refer to computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored. A consensus algorithm, which may incorporate the smart contract or chaincode or may be executed in a separate process in addition to or instead of the smart contract or chaincode, may be executed by the nodes of the distributed ledger to determine whether a proposed data record should be added to the distributed ledger. In the latter case, the consensus algorithm may be used to confirm that a majority of the validation nodes agree on the results of the smart contract or chaincode. In some embodiments, the consensus algorithm may further be used to determine an order in which proposed data records are added to the distributed ledger.

Embodiments of the disclosure as described herein may utilize one, several, or a combination (i.e., hybrid) of a number of different consensus algorithms to ensure the integrity of the data records within the blockchain. A non-exhaustive description of exemplary consensus algorithms follows. In some embodiments, the consensus mechanism may be a "proof of work" ("PoW") algorithm, in which the nodes perform a series of calculations to solve a cryptographic puzzle. For instance, in order to validate a pending data record, the nodes may be required to calculate a hash via a hash algorithm (e.g., SHA256) that satisfies certain conditions set by the system. Calculating a hash in this way may be referred to herein as "mining," and thus nodes performing the mining may be referred to as "miners" or "miner nodes." The system may, for example, require the value of the hash to be under a specific threshold. In such embodiments, the nodes may combine a "base string" (i.e., a combination of various types of metadata within a block header, e.g., root hashes, hashes of previous blocks, timestamps, etc.) with a "nonce" (e.g., a whole number value) to be input into the PoW algorithm to produce a hash. In an exemplary embodiment, the nonce may initially be set to 0 when calculating a hash value using the PoW algorithm. The nonce may then be incremented by a value of 1 and used to calculate a new hash value as necessary until a node is able to determine a nonce value that results in a hash value under a specified threshold (e.g., a requirement that the resulting hash begins with a specified number of zeros). The first node to identify a valid nonce may broadcast the solution (in this example, the nonce value) to the other nodes of the blockchain for validation. Once the other nodes have validated the "winning" node's solution, the pending data record may be appended to the last block in the blockchain. In some cases, a divergence in blockchain copies may occur if multiple nodes calculate a valid solution in a short timeframe. In such cases, the nodes using the PoW algorithm accept the longest chain of blocks (i.e., the chain with the greatest proof of work) as the "true" version of the blockchain. Subsequently, all nodes having a divergent version of the blockchain may reconcile their copies of the blockchain to match the true version as determined by the consensus mechanism.

In other embodiments, the consensus mechanism may be a "proof of stake" ("PoS") algorithm, in which the validation of pending data records depends on a user's "stake" within the blockchain. For example, the user's "stake" may depend on the user's stake in a digital currency or point system (e.g., a cryptocurrency, reputation point system, etc.) within the blockchain. The next block in the blockchain may then be decided by the pending data record that collects the greatest number of votes. A greater stake (e.g., in a given digital currency or point system) results in a greater number of votes that the user may allocate to particular pending data records, which in turn increases the chance for a particular user to create blocks in the blockchain system.

In yet other embodiments, the consensus mechanism may be a "practical byzantine fault tolerance" ("PBFT") algorithm, in which each node validates pending data records by using a stored internal state within the node. In particular, a user or node may submit a request to post a pending data record to the blockchain. Each of the nodes in the blockchain may then run the PBFT algorithm using the pending data record and each node's internal state to come to a conclusion about the pending data record's validity. Upon reaching said conclusion, each node may submit a vote (e.g., "yes" or "no") to the other nodes in the blockchain. A consensus is reached amongst the nodes by taking into account the total number of votes submitted by the nodes. Subsequently, once a threshold number of nodes have voted "yes," the pending data record is treated as "valid" and is thereafter appended to the blockchain across all of the nodes. It should be understood that although the consensus mechanisms have been described herein in the context of blockchains, the consensus mechanisms may also be applicable to other forms of distributed ledgers.

Figure 4:
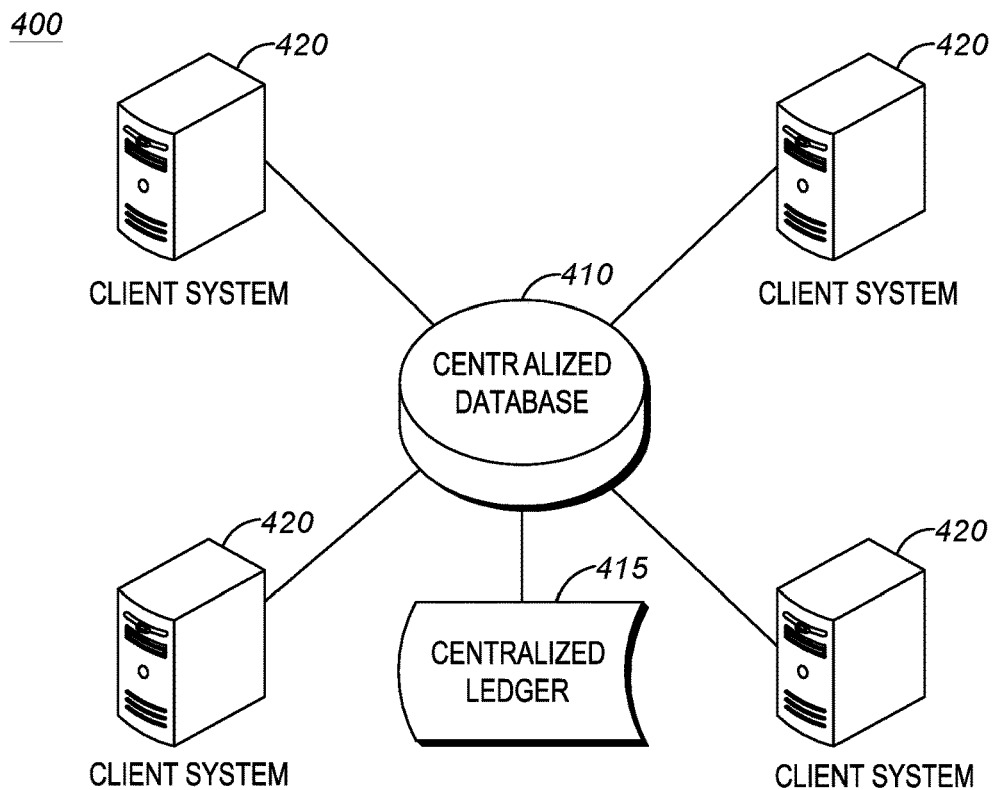
FIG. 4 is a system diagram of a centralized database comprising a centralized ledger.

FIG. 4 is a symbol diagram illustrating a centralized database system 400 that may comprise a centralized database 410 that hosts a centralized ledger 415 or other centralized data. The centralized database 410 may be in operative communication over a network with one or more client systems 420 and is configured to allow the client systems 420 to access and interact with the data stored in the centralized ledger 415. Implementing a ledger on a centralized database for agency, personnel, incident, or other types of data poses a number of technical challenges. For instance, a centralized database 410 may be a single point of failure; if the centralized database 410 suffers any type of data loss or corruption or otherwise becomes unavailable (e.g., the database is offline or has been damaged), none of the client systems 420 may be able to access a full verified copy of the data within the centralized ledger 415. Furthermore, the data within centralized ledger 415 may be vulnerable to malicious or improper manipulation, as the centralized database 410 may serve as a single point of attack. Therefore, there is a need for a more secure and resilient way to validate, store, and manage data to maintain accurate copies of validated data (e.g., by ensuring that only information that is validated is allowed to be added to the ledger), and in order to resist unauthorized or unexpected changes to the agency, personnel, incident, or other types of data stored in a database as well as avoid centralized server downtimes.

Figure 5:
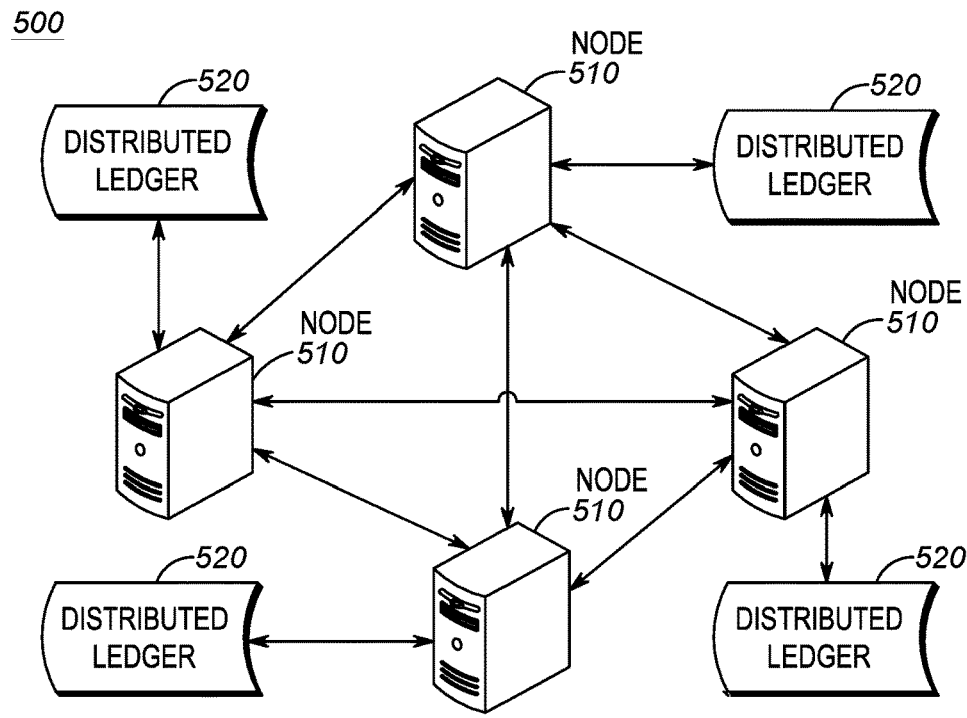
FIG. 5 is a system diagram of a distributed electronic ledger hosted on a plurality of nodes, in accordance with some embodiments.

FIG. 5 is a symbol diagram illustrating a distributed electronic ledger system 500 comprising a distributed ledger 520 stored in a decentralized manner across a plurality of nodes 510, in accordance with some embodiments. In some embodiments, the distributed ledger 520 may be a blockchain. Each node 510 may be a computing device, that may be in operative communication with the other nodes 510 over a network, and each node 510 may host a complete copy of the distributed ledger 520. In this regard, the nodes 510 may be part of an agency's infrastructure (e.g., the agency's distributed network of servers, databases, computers, mobile devices, sensors, equipment, and other electronic resources) or part of a cloud computing cluster used and/or operated by the agency. It should further be noted that some of the communication devices as seen in FIGS. 1-3, in addition to providing data that may be stored in the distributed ledger, may also function as "nodes" in the distributed ledger. Further, and although not illustrated in FIG. 5, each of the nodes 510 may additionally have access to a centralized database 410 in a same or similar manner to that illustrated in FIG. 4.

When additional data records are proposed to be added to the distributed ledger 520, each of the nodes 510 perform a validation check on the proposed additional data records either using hard-coded validation check mechanism or by executing chaincode or a smart contract containing the validation check mechanisms, and thereby come to a consensus, via a consensus algorithm, whether the proposed data record should be added to the distributed ledger 520.

Once the proposed data record has been validated through the consensus algorithm, the proposed data record is added to each of the distributed ledgers 520 across all of the nodes 510.

In some embodiments, the distributed ledger 520 allows data records to be appended but does not allow for direct modification of existing data records or any of the other data or metadata existing within the distributed ledger (e.g., blocks in a blockchain). In other embodiments, the distributed ledger 520 allows data records to be directly modified, but maintains a history of previous data record versions and the modifications that were made. In this way, the distributed ledger 520 may comprise all of the data records written to it since its creation. If a particular node 510 were to become unavailable (e.g., due to being offline, hardware failures, security breaches, and the like), the remaining nodes 510 will remain available to host a verified copy of the distributed ledger 520. Furthermore, if data records within the distributed ledger 520 hosted on a particular node 510 were to be deleted, modified, or otherwise compromised, the remaining nodes 510 may serve as references to determine the true version of the distributed ledger 520. In some embodiments, a compromised node 510 may be taken offline such that the corrupted ledger is inaccessible. In other embodiments, the compromised node 510 may automatically correct its copy of the distributed ledger 520 based on the distributed ledger 520 stored on the remaining nodes 510 via a consensus mechanism.

Figure 6:
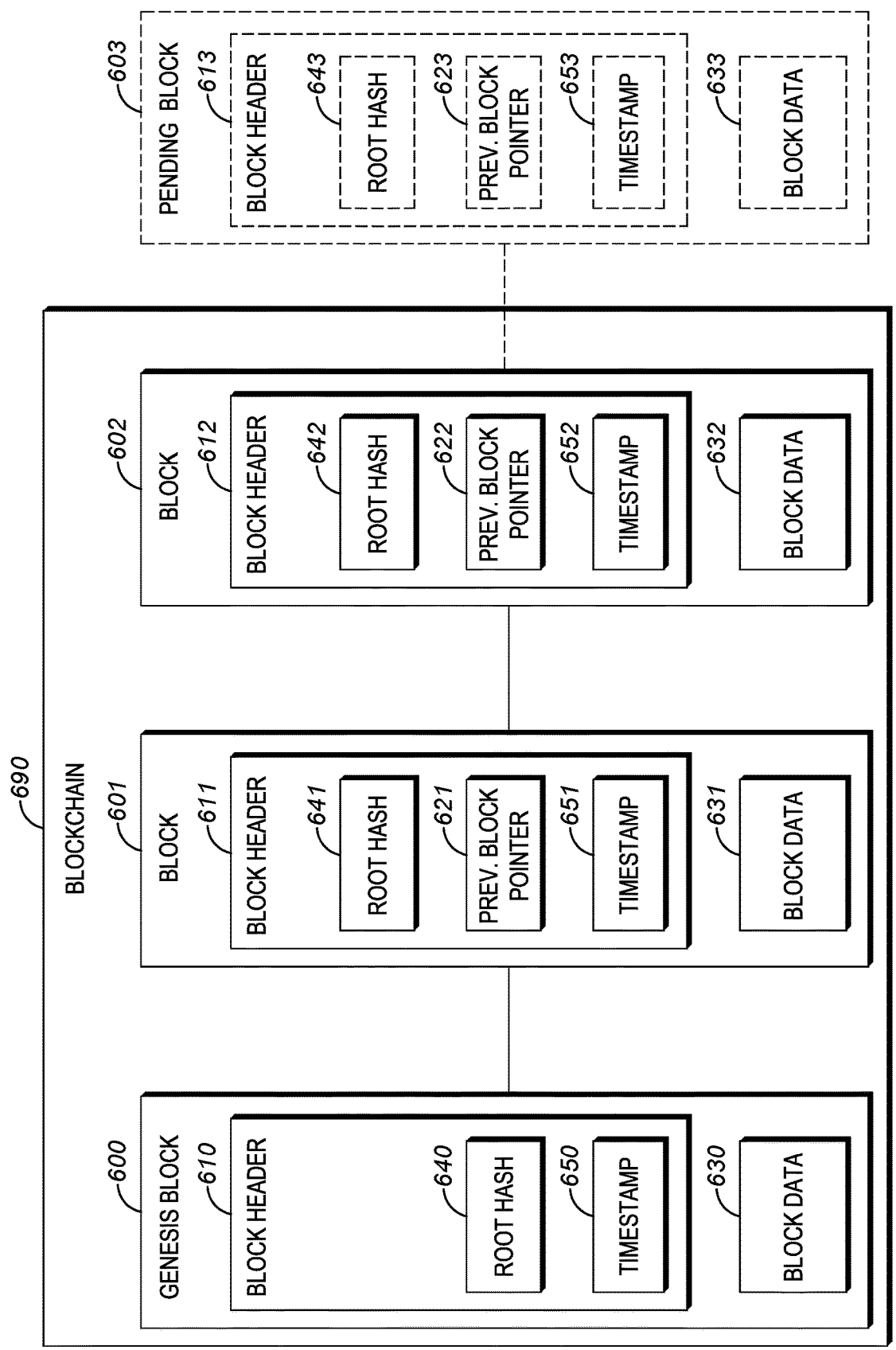
FIG. 6 is a block diagram illustrating data and metadata structures within an example blockchain distributed electronic ledger, in accordance with some embodiments.

As noted herein, a distributed ledger may take the form of a blockchain. In this regard, FIG. 6 is a block diagram illustrating data structures of a blockchain 690 in detail, in accordance with some embodiments. In particular, FIG. 6 depicts a plurality of blocks 600, 601, and 602 contained in a blockchain 690, in addition to a proposed block 603 to be appended to the last block 602 in the blockchain. The blockchain 690 may comprise a genesis block 600 that serves as the first block in the blockchain. The genesis block 600, like all other blocks within the blockchain 690, comprise a block header 610 and block data 630. Each block data 630 within a block 600 may contain a wide range of different types of data records. For instance, in some embodiments, the block data 630 may comprise electronic files such as documents, media files, and the like. In other embodiments, the block data 630 may contain one or more transactions, which may be defined as an event, occurrence, or state that an agent and/or agency wishes to record in the distributed ledger. In yet other embodiments, the block data 630 may comprise other data structures, such as pointers that provide a link to a file that may exist outside of the blockchain. Such a file may exist locally, within another computing system on the network, or on a remote computing system. In some embodiments, pending data records may be stored in a memory pool to be added to the block data 630 once the pending data records have been validated by the system.

The block header 610 may comprise various types of metadata regarding the block data 630. In some embodiments, the block header 610 may comprise a root hash 640, which is a hash derived from the block data 630. In some embodiments, the root hash 640 may be a Merkle root hash, wherein the root hash 640 is calculated via a hash algorithm based on a combination of the hashes of each transaction within the block data 630. In this way, any changes to the data within the block data 630 will result in a change in the root hash. The block header 610 may further comprise a timestamp 650 that indicates the time at which the block was written to the blockchain 690. In some embodiments, the timestamp may be a Unix timestamp. In some embodiments, particularly in blockchains utilizing a PoW consensus mechanism, the block header 610 may comprise a nonce value and a difficulty value. The nonce value may be a whole number value that causes the hash of the block header 610 to satisfy the difficulty level of the cryptographic puzzle as defined by the difficulty value. For instance, the consensus mechanism may require that the resulting hash of the block header 610 metadata falls below a certain value threshold (e.g., the hash must start with a certain number of zeroes, as defined by the difficulty value).

A subsequent block 601 may be appended to the genesis block 600 to serve as the next block in the blockchain. Like all other blocks, the subsequent block 601 comprises a block header 611 and block data 631. Similarly, the block header 611 may comprise a root hash 641 of the data within the block data 631 and a timestamp 651. The block header 611 may further comprise a previous block pointer 621, which may be a hash calculated by combining the hashes of the metadata (e.g., the root hash 640, timestamp 650, and the like) within the block header 610 of the genesis block 600. The block pointer 621 may be used to identify the previous block (i.e., the genesis block 600) in the blockchain 690. Of course, other types of previous block pointers and other methods of generating and storing a hash of a previous block could be used in a subsequent block in other types of distributed ledger implementations.

A subsequent block 602 may be appended to the block 601, where the subsequent block 602 also comprises a block header 612 and block data 632. Similarly, the block header 612 may comprise a root hash 642 of the data within the block data 632 and a timestamp 652. The block header 612 may also comprise a previous block pointer 622 that points to the previous block 601, where the previous block pointer 622 may be a hash value derived by combining the metadata within the block header 611 (including the previous block pointer 621) into a hash algorithm. The block pointer 622 may identify the previous block 601 in the blockchain 690.

In this way, the values of each previous block pointer 621, 622 within the blockchain are dependent on the hashes of the block headers of all of the previous blocks in the chain; if the block data within any of the blocks is altered, the block header for the altered block as well as all subsequent blocks will result in different hash values, i.e., the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. In other words, an unauthorized user who wishes to alter a data record within a particular block must also alter the hashes of all of the subsequent blocks in the chain in order for the altered copy of the blockchain to pass the validation checks imposed by the consensus algorithm. Thus, the computational impracticability of altering data records in a blockchain in turn greatly reduces the risk of improper alteration of data records.

A pending block 603 or "proposed block" may be submitted for addition to the blockchain. The pending block 603 may comprise a block header 613, which may comprise a root hash 643, a previous block pointer 623 that points to the block 602, a timestamp 653, and block data 633. Once a pending block 603 is submitted to the system, the nodes within the system may validate the pending block 603 via a consensus algorithm. The consensus algorithm may be, for instance, a proof of work mechanism, in which a node determines a nonce value that, when combined with a hash of the block header 612 of the last block in the blockchain, produces a hash value that falls under a specified threshold value. For instance, the PoW algorithm may require that said hash value begins with a certain number of zeroes. Once said nonce value is determined by one of the nodes in the blockchain, the node may post the "solution" to the other nodes in the blockchain. Once the solution is validated by the other nodes, the hash of the block header 612 is included in the block header 613 of the pending block 603 as the previous block pointer 623. The block header 613 may further comprise the root hash 643 of the block data 633 which may be calculated based on the winning solution. The pending block 603 is subsequently considered to be appended to the previous block 602 and becomes a part of the blockchain 690. A timestamp 653 may also be added to signify the time at which the pending block 603 is added to the blockchain 690. In other embodiments, the consensus mechanism may be based on a total number of votes submitted by the nodes of the blockchain 690, e.g., a PBFT consensus mechanism. Once a threshold number of votes to validate the pending block 603 has been reached, the pending block 603 may be appended to the blockchain 690. In such embodiments, nonce values and difficulty values may be absent from the block headers.

The distributed ledger as described herein may be an incident-based distributed ledger that may store data records relating to incidents that one or more agencies (e.g., public service or utilities agencies) may be tasked to resolve. In such embodiments, the distributed ledger may take various different forms. For instance, an incident-based distributed ledger may be created for each incident. In other words, each incident-based distributed ledger may comprise one or more incident-related data records associated with a particular incident. In an exemplary embodiment, an incident-based distributed ledger may be associated with a particular traffic accident. In such an embodiment, the incident-based distributed ledger may be managed by one or more agencies (e.g., a police department, a fire department, and the like) and may comprise all of the incident-related data records associated with the traffic accident (e.g., incident-related data record that creates the incident, incident-related data records indicating the incident's status, incident-related data records containing evidence data, and the like). In some embodiments, the incident-based distributed ledger may be configured to allow incident-related data records to be written to the incident-based distributed ledger while the incident is still pending. In such embodiments, once an incident-related data record indicating the resolution of an incident is written to the incident-based distributed ledger, additional incident-related data records may be prevented from being written to the incident-based distributed ledger.

In some embodiments, an agency distributed ledger may be created for each agency, such that the agency distributed ledger comprises all of the data records related to a particular agency (e.g., an originating agency). In an exemplary embodiment, an agency distributed ledger may be created for a fire department. In such an embodiment, the agency distributed ledger may comprise all of the data records relating to the fire department, such as incident-related data records relating to particular incidents, incident-related data records that assign attributes to incidents and/or resources within the fire department, data records that are not related to particular incidents, and the like. In some embodiments, the agency distributed ledger may be configured to allow multiple agencies (e.g., a police department, a regulatory agency) to view and validate data records on the agency distributed ledger, but only allow a particular agency (e.g., the fire department) to submit proposed data records to the agency distributed ledger. In other embodiments, a shared agency distributed ledger may be created for a set of multiple agencies. In such embodiments, the shared agency distributed ledger may be shared amongst the multiple agencies, and each participating agency on the shared agency distributed ledger may access and/or view data records, submit proposed data records, and validate data records.

In other embodiments, a jurisdictional distributed ledger may be created for one or more agencies within a particular jurisdiction. For example, a jurisdictional distributed ledger may be created for a number of statewide agencies (e.g., police department, fire department, medical department) within a particular state (e.g., Nevada). In such embodiments, the jurisdictional distributed ledger may comprise the data records associated with the various state-based agencies. In some embodiments, the data records may comprise data or metadata that identify the data records and distinguish them from other data records. For instance, the data or metadata associated with a particular data record may identify the data record as a data record submitted by the police department of Nevada.

In some embodiments, at least a portion of the data records within the jurisdictional distributed ledger may be accessed and/or viewed by the agencies participating in the jurisdictional distributed ledger, while at least a portion of the data records may be encrypted (or otherwise have controlled access) such that only a particular agency (or subset of agencies) may access and/or view such portion of the data records. For example, private agency information (e.g., police officer identities) may be encrypted within the data records such that only the agency (e.g., police department) associated with such private agency information may access and/or view said data records. By way of further example, rather than being stored in the distributed ledger, private agency information may stored in a separate access-controlled database, and relevant data records of the distributed ledger may include pointers to (and/or cryptographic hashes of) such private agency information stored in the separate access-controlled database.

In some embodiments, the distributed ledger may be a hybrid combination of two or more of the various types of distributed ledgers as described herein. For example, in some embodiments, each agency may be associated with an agency distributed ledger, where the data records within the agency distributed ledger may comprise embedded links to one or more incident-based distributed ledgers.

In some embodiments, the distributed ledger may be a hybrid public/permissioned distributed ledger that comprises public incident-related data records and private incident-related data records. In such embodiments, the hybrid public/permissioned distributed ledger may be configured to allow members of the public to access and/or view at least a portion of the incident-related data records (e.g., public incident-related data records or public portions of incident-related data records) within the distributed ledger, while other incident-related data records or portions of incident-related data records (e.g., private incident-related data records or private portions of incident-related data records) may be encrypted (e.g., protected by other access controls) such that they may only be accessed by authorized users. In an exemplary embodiment, a police department may host a hybrid public/permissioned distributed ledger in which the public may access certain public portions of incident-related data records (e.g., anonymized police officer identifiers, incident titles or locations, etc.) while only authorized users (e.g., users or agents within the police department) may access the private portions of incident-related data records (e.g., officer identities, suspect identities, etc.) and/or validate incident-related data records (e.g., participate in the consensus). Private portions of incident-related data records may be encrypted. In some embodiments, private information may be stored in a separate access-controlled database, and the relevant incident-related data records of the distributed ledger maintain pointers to (and/or cryptographic hashes of) such private information. In additional embodiments, private incident-related data records may be contained in one or more private, permissioned distributed ledgers, public incident-related data records may be contained in a public distributed ledger, and, where applicable, such public incident-related data records may include pointers to (and/or cryptographic hashes of) relevant private incident-related data records.

In some embodiments, a second distributed ledger may be used in conjunction with the distributed ledger. For instance, in some embodiments, the distributed ledger may comprise one or more data records that have not yet been validated by the nodes (e.g., the distributed ledger allows proposed data records to be written regardless of validity). Once the nodes have performed validation of the proposed data records within the distributed ledger, the nodes may write a copy of the validated proposed data records to the second distributed ledger. In this way, the distributed ledger may comprise all proposed data records submitted to the distributed ledger, while the second distributed ledger comprises only validated proposed data records. In other embodiments, the second distributed ledger may comprise indications of validity (e.g., data records) that refer back to proposed data records within the distributed ledger and indicate whether the proposed data records are valid or invalid. In this way, the distributed ledger comprises all proposed data records submitted to the distributed ledger while the second distributed ledger comprises indications of validity (with pointers to valid proposed data records within the distributed ledger) instead of full copies of the validated data records.

The distributed ledger as described herein may store various types of data records that may relate to public safety (e.g., police, fire, or medical) or enterprise (e.g., utilities, oil/gas, electric, or business) agencies. For instance, as noted above, the data records may include "incident-related data records," or data records that are associated with a particular incident (e.g., an occurrence of an event that an agent within a particular agency has jurisdiction and must respond to). Accordingly, incident-related data records may be data records that define an incident, assign resources to an incident, open or close an incident, or the like.

The distributed ledger may also include "attribute data records," or data records that define attributes of individuals, agents, resources, agencies, incidents, or the like. Said attributes may include locations, statuses, roles, skills, and the like. In some embodiments, an attribute data record may be associated with an incident (e.g., the attribute data record may also be an incident-related data record). For instance, such an attribute data record may define valid incident types that may be assigned to a particular incident. In other embodiments, an attribute data record may not be associated with a particular incident (e.g., an attribute data record may define an agent's role without regard for a particular incident or may include other information not related to a particular incident, such as available equipment, equipment status or location, time of day or day of week, among other information).

The distributed ledger may also include "validation response data records," or data records that indicate a response provided by the nodes of the distributed ledger with respect to the validity of a proposed data record. In some embodiments, the validation response may be a validation vote data record that indicates whether a node has voted "yes" or "no" to validate a proposed data record. In some embodiments, the validation vote data record may be an intra-agency validation vote data record, that indicates whether a node within a single agency has voted "yes" or "no" to validate a proposed data record submitted by a node or agent with the agency. In the context of an inter-agency distributed ledger, the validation vote data record may be an inter-agency validation vote data record that indicates whether a node within the agency from which the proposed data record is submitted (e.g., the originating agency) or a node external to the originating agency has voted "yes" or "no" to validate a proposed data record.

The distributed ledger may also include "approval data records," or data records that indicate that an agent within an agency (e.g., an administrator/admin such as a project manager, dispatcher, CAD operator, or on-scene commander) has approved or rejected a proposed data record submitted by another agent within the agency (e.g., a data record submitted by an individual who claims to have a particular skill set). In such embodiments, the validity of said proposed data record may depend on the approval data record submitted by the administrator or other agent within the agency.

The distributed ledger may also include "responsive data records," or data records that indicate the validity of a proposed data record submitted by an originating agent within an agency. Responsive data records may include the results of one or more validation checks based on intra-agency validation criteria performed by one or more second agents within the agency. If the responsive data record indicates that the proposed data record has satisfied the intra-agency validation criteria, the responsive data record may be considered to approve the proposed data record. Conversely, if the responsive data record indicates that the proposed data record does not satisfy the intra-agency validation criteria, the responsive data record may be considered to reject the proposed data record.

Arranging and using a digital ledger in a distributed and decentralized manner across multiple nodes in the manner described herein provides a number of technical advantages over using a centralized ledger hosted on a centralized database. For example, because multiple nodes may host a full copy of the distributed ledger, the system does not have a single point of failure, and thus the distributed ledger may continue to be accessible even if one or more nodes fail or are compromised. Furthermore, in embodiments in which the distributed ledger uses a blockchain, a blockchain structure may help to ensure that the data records in a distributed ledger are practically immutable, thereby greatly increasing the security and integrity of the data stored in the digital ledger. Various digital ledger structures and validation checks as described herein may also provide additional trust in the initial and continued validity of data records stored or referenced by the distributed ledger, and provides for an improved method of entering, storing, and tracking intra and/or inter-agency data records across geographically dispersed networks.

3. SYSTEM AND PROCESSES FOR VALIDATING AND APPENDING INCIDENT-RELATED DATA RECORDS IN AN INTER-AGENCY DISTRIBUTED ELECTRONIC LEDGER

Figure 7:
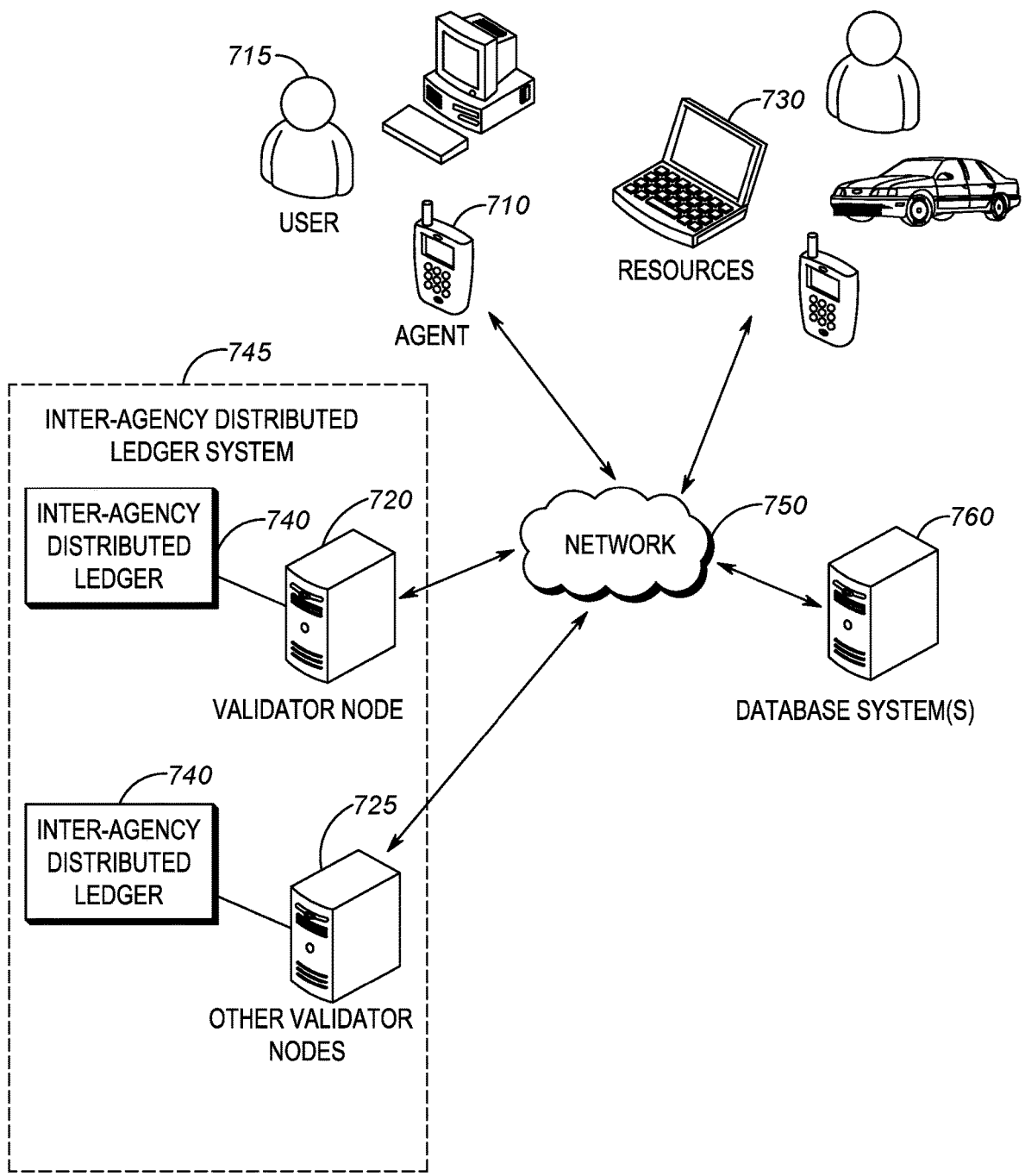
FIG. 7 is a system diagram illustrating an operating environment for an inter-agency distributed electronic ledger system, in accordance with some embodiments.

FIG. 7 is a symbol diagram illustrating an operating environment 700 for the inter-agency distributed ledger system, in accordance with an embodiment. "Inter-agency distributed ledger" as described herein may refer to an electronic ledger distributed amongst at least one node of an originating agency and at least one node of an external agency separate from the originating agency. The operating environment 700 may comprise a validator node 720 in operative communication with other validator nodes 725 over a network 750. In some embodiments, the validator node 720 is hosted and operated by an originating agency while the other validator nodes 725 are each operated by different (external) agencies (e.g., a second agency, a third agency, etc.). The validator node 720 and other validator nodes 725 each host a complete copy of the inter-agency distributed ledger 740. The nodes 720, 725 together with the distributed ledger may be referred to herein as the "inter-agency distributed ledger system" 745. In particular, the nodes 720, 725 may maintain consensus with one another to host synchronized copies of the inter-agency distributed ledger 740. In some embodiments, the inter-agency distributed ledger is a permissioned blockchain (e.g., only authorized devices may transact with the blockchain and/or validate incident-related or other data records). In some embodiments, the validator nodes 720, 725 may further be in operative communication with one or more agents 710. The components of the operating environment 700 as shown in FIG. 7 may also be represented by one or more components as seen in FIG. 1-3. For example, in some embodiments, the nodes 720, 725 may be the communication devices 200 in FIG. 2 or FIG. 3. In other embodiments, the nodes 720, 725 may be computing systems within the infrastructure RAN 152 in FIG. 2 or the cloud computing cluster 162 in FIG. 1. Furthermore, the network 750 may be the IP network as seen in FIG. 1. Other possibilities exist as well.

The inter-agency distributed ledger of FIG. 7 may be any type of distributed ledger (including a hybrid distributed ledger) as set forth earlier. For example, the inter-agency distributed ledger may be an agency distributed ledger (e.g., the inter-agency distributed ledger only contains data records associated with a particular agency, such as a fire department). In such embodiments, only the particular agency (e.g., fire department) may submit proposed data records and/or responsive data records, while the nodes of external agencies may only view the data records or a portion of data records within the inter-agency distributed ledger and/or participate in the consensus of data records.

In other embodiments, the inter-agency distributed ledger may contain the data records of each agency that is a participant in the inter-agency distributed ledger. In such embodiments, the inter-agency distributed ledger may comprise the incident information, workflows, and other types of information associated with each participating agency.

"Agent" as used herein may refer to a user 715 (e.g., an individual within an agency) within a particular agency's control. In such embodiments, the user 715 may be represented by the user 102 as seen in FIG. 1. The agent may be an originating agent (e.g., the agent originally submitting a proposed data record) and the agency may be an originating agency (e.g., the agency from which the proposed data record originates). Other agents in the originating agency (e.g., other agents in the originating agency that are not the originating agent) or other agents in external agencies (e.g., other agents in those agencies other than the originating agency) may also perform various functions within the disclosed system. In some embodiments, the agent 710 may be a human agent or may be an automated agent (e.g., a particular software program running on a computer or bot) that may be configured to interact with the distributed ledger system 745. Each agent 710 may utilize a computing device (e.g., a communication device 200 as described above) to interact with the distributed ledger system 745. An originating agent 710 may submit proposed data records to be added into the distributed ledger, and may further be authorized to access previously written data records on the copies of the distributed ledger 740 stored on the validator nodes 720, 725. In some embodiments, the proposed data records may pertain to a particular incident (e.g., a proposed incident-related data record), such as a traffic accident, public disturbance, natural disaster, utilities-related issue or hazard, and the like. For instance, the proposed incident-related data record may contain an allocation of resources (e.g., responders such as police officers, firefighters, medical staff, utilities workers, equipment, etc.) to a particular incident. In other embodiments, the proposed data records may pertain to particular individuals within an agency (e.g., proposed attribute data records that may assign roles or skills to individuals).

The validator nodes 720, 725 may further be in operative communication with one or more resources 730. "Resources" as used herein may refer to an intangible or tangible objects or individuals that the agency may use to perform various functions of the agency. Accordingly, "resource" may refer to various types of equipment such as portable devices such as laptops, mobile cameras (e.g., body cameras or dash cameras), vehicles, drones, breathing apparatus, infrared imagers, smartphone/smart devices, and the like. For example, a communication device 200 as described above may constitute a resource 730. In other embodiments, the vehicle 132 or the user 102 as seen in FIG. 1 may be a resource 730. Said equipment may further include static structures such as power lines, water lines, power plants, and the like, that allow the agency to perform its functions. In some embodiments, a resource may also be individual such as a responder, where the responder may be a police officer, medical personnel, public safety officer, utility worker, and the like. In such embodiments, an individual within the agency may simultaneously be a resource (e.g., a responder may be assigned to an incident's location) and an agent (e.g., the responder may upload incident data to the distributed ledger system 745 while the responder is located at the scene of the incident). The data submitted to the distributed ledger system by the various agents and/or resources may comprise, for instance, video, image, and/or audio data, text or document data, and the like, where the submitted data may be associated with an incident. In some embodiments, other resources may also serve as an agent. For instance, a police vehicle as described in FIG. 1 may be a resource that is assigned to a particular incident. That said, a police vehicle equipped with a communication device that is configured to automatically submit incident-related data records (e.g., dashcam footage) to the distributed ledger may also be considered an agent.

The operating environment 700 may further comprise one or more database systems 760 in operative communication with the other devices in the distributed ledger system. In some embodiments, the database system 760 may be the one or more databases 164 as seen in FIG. 1. In some embodiments, a database system 760 may comprise data (e.g., evidence related to an incident) obtained from one or more resources 730 that may or may not also be stored on the distributed ledger. For example, the distributed ledger system 745 may determine that a video file having a large file size should be stored on the database system 760 in order to prevent data bloat on the distributed ledger. In such embodiments, an incident-related data record may be appended to the distributed ledger in which such incident-related data record contains a digital fingerprint of the file as well as a pointer to (and/or cryptographic hash of) the file stored on the database system 760 rather than a copy of such file. The digital fingerprint may be a cryptographic hash of the large data file such that agents 710 may compare a hash calculated from the large data file on the database system 760 with the digital fingerprint. In this way, the distributed ledger system provides users 715 with a way to access large data files and verify that the large data files are unmodified originals, while preventing the computing inefficiencies associated with storing large data files on the distributed ledger 740. It should be understood by those skilled in the art that although the systems and devices depicted herein may be represented as single unit, said systems and devices may comprise a plurality of separate systems and/or devices. It should further be further understood that the computing devices as depicted in FIG. 7 (e.g., the nodes 720, 725, computing devices employed by the agents 710, or various resource 730 devices such as body cameras, dash cameras, laptops, smartphones, etc.) may be, for example, the communication devices as described with respect to FIGS. 1-3. In addition, one or more of the database systems 760 may be one or more of the databases 164 described above.

In some embodiments, an incident-related data record may comprise metadata or other information regarding an item, an action taken, a person, or an article of physical evidence associated with an incident. The metadata may comprise a description of the item, action, person, or article of physical evidence (e.g., characteristics such as appearance, size, weight, etc.) and perhaps a location in which the physical evidence was originally viewed or is now physically stored. In an exemplary embodiment, a responder (e.g., a police officer) may submit a proposed incident-related data record that contains metadata regarding a piece of evidence that the responder has collected from an incident site (e.g., a pair of shoes associated with a suspect associated with a particular incident). The metadata may comprise information about the characteristics of the shoes (e.g., color, size, shoe type, materials, condition, etc.) as well as the location in which the shoes are stored (e.g., locker number, facility address/location, etc.). The metadata may include information regarding chain of custody for the physical evidence (e.g., the responder transferred the physical evidence to an individual in charge of placing the evidence in physical storage). In some embodiments, the metadata may point to an image or video file stored at a centralized on-premises agency server or stored at a cloud-based storage location that contains digital images of the shoes. The metadata may be located in a single incident-related data record or divided over multiple incident-related data records (e.g., multiple incident data records created over time as the physical evidence is collected, examined, and transferred from the scene of an incident to physical storage). In this way, the distributed ledger system may provide agencies with a reliable way to store data and/or metadata regarding both electronic and physical evidence associated with an incident.

Figure 8:
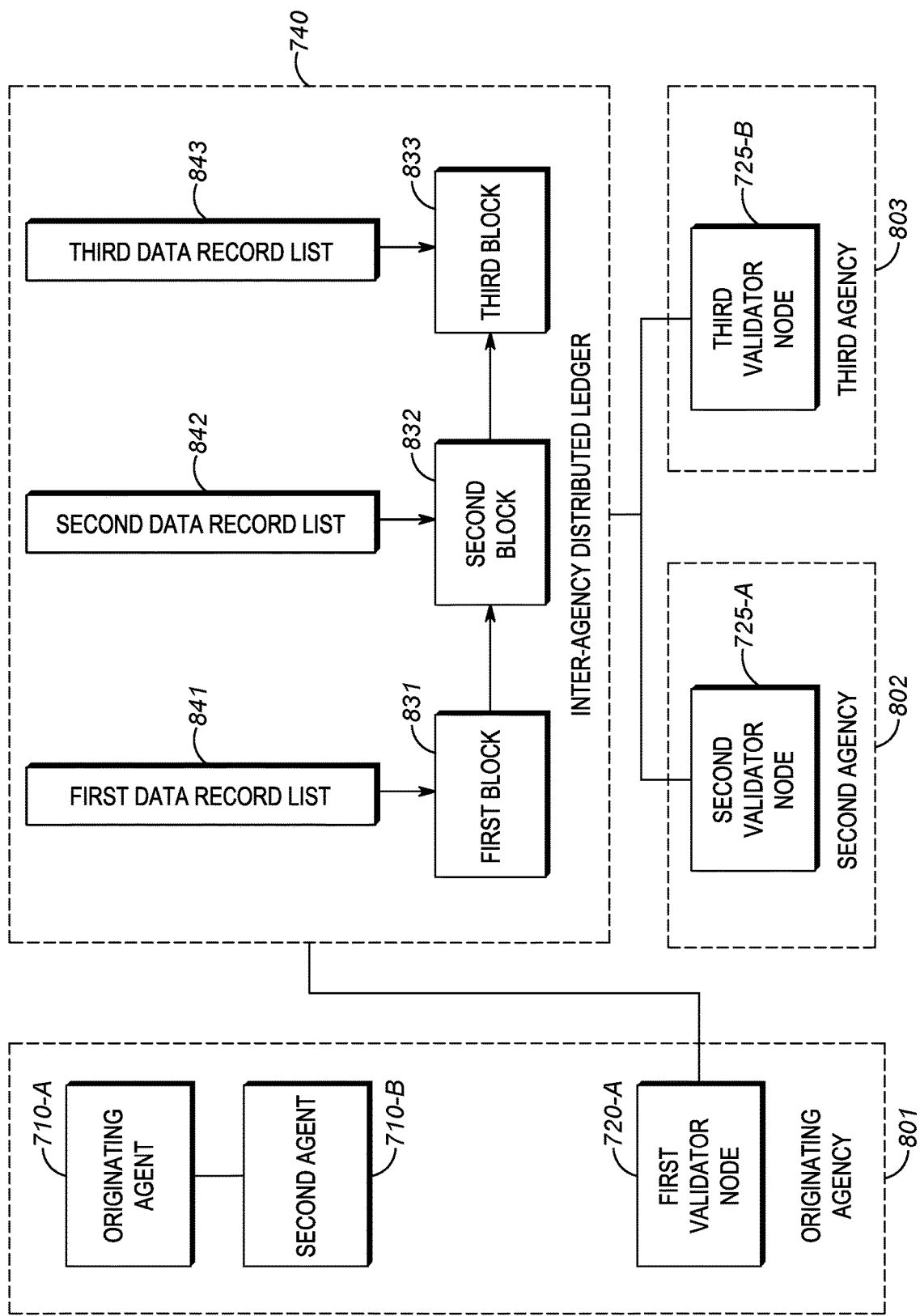
FIG. 8 is a block diagram illustrating the inter-agency distributed electronic ledger system in more detail, in accordance with some embodiments.

FIG. 8 illustrates logical structures within the inter-agency distributed ledger system, in accordance with some embodiments. In particular, the system may comprise an inter-agency distributed ledger 740 hosted at least on a first validator node 720-A (which may function as an intra-agency validator node for proposed data records originating from originating agency 801) associated with originating agency 801, a second validator node 725-A (which may function as an inter-agency validator node for proposed data records originating from originating agency 801) associated with a second (external) agency 802, and a third validator node 725-B (which may also function as an inter-agency validator node for proposed data records originating from originating agency 801) associated with a third (external) agency 803. The first validator node 720-A, second validator node 725-A, and the third validator node 725-B may each host a complete copy of the inter-agency distributed ledger 740. In some embodiments, the first validator node 720-A may function to validate data records (e.g., including incident-related data records, attribute data records, and responsive data records) originating from within originating agency 801, while in other embodiments it may function to validate data records originating from within the second agency 802 and/or the third agency 803, while in still other embodiments, the first validator node 720-A may perform both such functions.

For the purposes of FIG. 8, the inter-agency distributed ledger is depicted as a blockchain ledger, although other types of distributed ledgers are within the scope of the present disclosure. For instance, in some embodiments, the incident-related and other data records described herein may be stored in one or more separate databases (e.g., a CouchDB database) and the data records included in the distributed ledger may indicate any changes (e.g., new data records or changes to existing data records, new hashes of new or modified existing data records, etc.) to said data records in separate database(s). In such embodiments, the nodes 720 may access the data records within the separate database to validate new incident-related data records, and the distributed ledger may be used for error-checking and/or verification purposes.

In embodiments in which the inter-agency distributed ledger is a blockchain, the inter-agency distributed ledger may comprise a plurality of blocks in an ordered sequence. In such embodiments, the inter-agency distributed ledger may comprise a first block 831, a second block 832, and a third block 833 linked in order, where the first block 831 comprises a first data records list 841, the second block 832 comprises a second data records list 842, and the third block 833 comprises a third data records list 843. In some embodiments, the originating agency 801 may be associated with one or more agents 710-A, 710-B who may submit data records to the inter-agency distributed ledger. In some embodiments, the agents 710-A, 710-B may be users (e.g., agents, responders, dispatchers, etc.) within the originating agency 801. In other embodiments, the agents 710-A, 710-B may represent automated agents under the control of the originating agency 801.

An originating agent 710-A may submit a proposed data record to the inter-agency distributed ledger. In some embodiments, the proposed data record may be associated with a particular incident (e.g., a proposed incident-related data record). The data record may comprise various types of data, such as text or document data, media data, transaction data, and the like. In response to detecting the proposed data record, one or more second agents 710-B may analyze the proposed data record using a first set of validation criteria, e.g., intra-agency criteria. If the second agent 710-B detects that the proposed data record and/or the status of the originating agent 710-A meets the first set of validation criteria, the second agent 710-B may submit a responsive data record (which itself may or may not be added to the inter-agency distributed ledger) indicating an approval of the proposed data record. Conversely, if the second agent 710-B detects that the proposed data record and/or the status of the originating agent 710-A does not meet the first set of validation criteria, the second agent 710-B may submit a responsive data record (which itself may or may not be added to the inter-agency distributed ledger) indicating a rejection of the proposed data record. In some embodiments, the proposed data records and/or the responsive data records may be stored in a temporary memory pool to await validation before being added to the inter-agency distributed ledger. In other embodiments, the proposed data records and/or the responsive data records may be incorporated into the inter-agency distributed ledger without first being validated. Subsequent data records may then be added to the inter-agency distributed ledger or some secondary ledger to indicate a validity or lack of validity of the previously un-validated data record(s).

In some embodiments, verifying that the proposed data record satisfies the first set of validation criteria (e.g., intra-agency validation criteria within the originating agency 801) may include performing one or more intra-agency validation checks using the proposed data record and/or the attributes or status of the originating agent 710-A. In performing the validation checks, the one or more second agents 710-B may use information from data records already existing on the inter-agency distributed ledger and/or other intra-agency information (e.g., an employee information database stored on an on-site server or cloud-based data store accessible to agents and/or nodes within the originating agency 801). In some embodiments, at least some of the information used to perform the intra-agency validation checks is private intra-agency information that is not accessible to external agencies. Such private intra-agency information may be stored on the inter-agency distributed ledger, but may be encrypted (or otherwise access controlled) to ensure that only agents and/or nodes within the originating agency 801 can access such information. Such private intra-agency information may be stored on one or more separate access controlled database that are inaccessible to agents and/or nodes outside of the originating agency 801.

The one or more second agents 710-B may rely on a number of different types of data, such as the location of the originating agent and/or the incident, the role of the originating agent, the skill set or expertise of the originating agent, the attributes and/or requirements of the incident (e.g., incident type), digital trust factors associated with the originating agent, and the like. If the proposed data record includes an assignment of resources to an incident, the one or more second agents 710-B may further use data regarding the attributes of the resource to be assigned, the location of the resource, and the like. A number of exemplary intra-agency validation checks will be discussed in turn.

For instance, the originating agent 710-A may submit a proposed data record that assigns a specific role (e.g., dispatcher, responder, operator, etc.) to an individual within the originating agency 801. The intra-agency validation checks to validate said proposed data record may include verifications of the originating agent's 710-A status (e.g., a check to ensure that the originating agent 710-A is an administrator/admin such as a project manager, dispatcher, CAD operator, or on-scene commander). The intra-agency validation checks may further include verifications of the proposed data record and/or the individual to whom the role is to be assigned. For instance, the validation checks may include checks to ensure that the proposed data record references a valid employee of the originating agency 801 identified by a unique employee ID, that the role to be assigned is of a valid type, and the like. The validation checks with respect to the individual may include checks to verify that the individual is capable of being assigned the role (e.g., the individual has the requisite background, experience, education, etc.), that the individual is a current employee of the originating agency 801, that the employee has the requisite level of trust as defined by a digital trust factor, and the like.

In embodiments in which the proposed data record is an incident-related data record, the intra-agency validation checks may additionally include verifications of the incident. For instance, an incident may be assigned various attributes (e.g., incident location, requirements, type, etc.) that may be used to validate certain proposed data records (e.g., data records that assign responding agents and/or resources to an incident). Accordingly, the validation checks may include checks to ensure that the a responding agent is located within a threshold distance of the incident, that the agent has the correct skills and/or experience to meet the incident's type (e.g., a fire) or other specific requirements (e.g., an incident may require expertise in dealing with forest fires). It should be understood that the foregoing examples were provided for illustrative purposes, and that other intra-agency validation criteria and/or validation checks may be used to validate proposed data records submitted by an originating agent 710-A.

In some embodiments, the originating agent 710-A (e.g., an admin) may submit an attribute data record that assigns an agent or resource to a particular talkgroup associated with an incident. Said attribute data record may subsequently be used as a validation check (e.g., may be part of the intra-validation criteria) for certain actions that may be taken by an agent or resource. For example, an admin agent 710-A may assign another agent (e.g., a police officer responder) to a talkgroup associated with a traffic accident. If the responder submits an incident-related data record associated with the traffic accident (e.g., evidence data collected from the scene), the one or more second agents 710-B may use said attribute data record to verify that the responder has been assigned to the talkgroup associated with the traffic accident.

Upon detecting the proposed data record and the one or more responsive data records, one or more of the external validator nodes 725-A, 725-B may evaluate a validity of the proposed data record based on a second set of inter-agency validation criteria, submit responses as to validity, and arrive at a consensus in view of the responses (e.g., applying a consensus algorithm). In some embodiments, the intra-agency validator node 720-A may also participate (along with the one or more external validator nodes) applying the consensus algorithm. In some embodiments, the validation checks according to inter-agency validation criteria may be an integral part of the consensus algorithm. In such embodiments, the "responses" as to validity may be validation votes that indicate whether the nodes have found, through the consensus algorithm, that the proposed data record is valid.

In other embodiments, the validation checks according to inter-agency validation criteria may be executed as a part of chaincode or smart contract logic which may be separate from the consensus algorithm. In such embodiments, each node may execute the chaincode or smart contract logic to determine whether the proposed data record is valid. Based on the results of executing the chaincode or smart contract logic, each node may submit "responses" as to validity, where the responses may indicate whether each node has correctly executed the chaincode or smart contract logic, whether each node has found that the proposed data record is valid, and/or that a majority of nodes agree on the results. Based on the responses as to validity, each node may, using the consensus algorithm, update the distributed ledger with the proposed data record. In such embodiments, the nodes may further use the consensus algorithm to determine an order of and/or timing at in which one or more proposed data records may be added to the distributed ledger.

The inter-agency validation criteria may take into account the responsive data records, the data within the proposed data records, previously appended records (whether incident-related, attribute, or responsive), and/or other same or similar data stored in centralized on-premises agency databases or cloud-based agency databases, in assessing the validity of the proposed data record. For instance, the inter-agency validation criteria may cause the proposed data record to be rejected if one or more of the responsive data records indicate a rejection of the proposed data record.

The consensus algorithm and/or smart contract or chaincode logic may further take into account the distributed ledger's transactional history, the history of the agents and/or agencies, and other trust factors to determine the validity of the proposed data record. In embodiments in which the validation checks are an integral part of the consensus algorithm, each node may, using the consensus algorithm, vote on whether to approve or reject the proposed data record (e.g., each node votes "yes" or "no"). In some embodiments, each node determines whether to approve or reject the proposed data record based on the same data inputs and/or algorithms as the other nodes. In other embodiments, the first validator node 720-A may be able to access private information of the originating agency 801 that is not available to the other nodes 725-A, 725-B in order to make a voting determination. The votes of each node may then be propagated to the other nodes within the system.

Once the votes of each node have been decided, the nodes may then use the consensus algorithm to determine whether the proposed data record is valid and/or should be appended to the ledger. For instance, the consensus algorithm may require that a threshold number (or threshold ratio) of nodes vote "yes" in order to validate the proposed data record. In some embodiments, once the consensus has been reached that the proposed data record is valid (e.g., the threshold number of nodes have voted "yes"), each node 720-A, 725-A, 725-B may append the proposed data record to its copy of the distributed ledger 740. In embodiments in which the distributed ledger is a blockchain, the proposed data record may be appended to the blockchain by incorporating the proposed data record into the data records list of the next block in the blockchain. Conversely, if a consensus has not been reached or if the consensus has been reached that the proposed data record is invalid, the nodes may reject the proposed data record and prevent the proposed data record from being incorporated into a data records list, which in turn prevents the proposed data record from becoming a part of the distributed ledger. In other embodiments, such as an embodiment in which all proposed data records and/or responsive data records are written to the distributed ledger, the nodes may write a rejection/acceptance data record or other indicator of validity to the data records list that indicates whether the proposed data record and/or responsive data records are valid or invalid.

As noted earlier, as an alternative to assessing validity via validation checks that are a part of a consensus algorithm, the nodes may assess validity of proposed data records via validation checks that are a part of a smart contract or chaincode. In such embodiments, rather than submitting votes as to the proposed data record's validity, the nodes may submit responses that indicate whether the nodes have correctly executed the logic of the smart contract or chaincode and/or whether the nodes have found the proposed data records to be valid via the smart contract logic or chaincode. Subsequently, the nodes may use the consensus algorithm to determine whether, based on the responses submitted by the nodes, to add the proposed data record to the distributed ledger or merely to determine a timing or order in which to add the proposed record to the distributed ledger. In some embodiments, the smart contract or chaincode algorithm may require that a threshold number of nodes have determined that the smart contract or chaincode logic has been executed correctly in order to add the proposed data record to the distributed ledger.

In an exemplary embodiment, which may be implemented using Hyperledger Fabric, an agent may submit a proposed data record to a first set of nodes that host the inter-agency distributed ledger, each of which may comprise a smart contract or chaincode that contain one or more validation checks. Each of the first set of nodes may execute the smart contract or chaincode and produce an endorsement (e.g., a vote as to whether the smart contract or chaincode has been correctly executed and/or whether the first set of nodes have found the proposed data record to be valid). Once the agent detects a threshold number of endorsements from the first set of nodes, the agent may submit the proposed data record to a second set of nodes (e.g., a set of orderer nodes). The orderer nodes may, based on a set of proposed data records received from one or more agents, submit votes to one another regarding the order of and/or timing at which to add the proposed data records to the distributed ledger. Once the votes have been propagated amongst the orderer nodes (e.g., a consensus has been reached), the orderer nodes may ultimately decide on the order and/or timing of proposed data records. The order and/or timing of adding the proposed data records may then be propagated to the first set of nodes, where each of the first set of nodes may verify that a threshold number of votes to validate the proposed data record have been reached and/or that the proposed data record is still valid (e.g., the distributed ledger system has not received other ledger updates that would invalidate the proposed data record). Each of the first set of nodes may then update its copy of the distributed ledger based on the order and/or timing of proposed data records as determined by the orderer nodes.

In some embodiments, all proposed data records and/or responsive data records may be written to a first distributed ledger regardless of whether they have been validated. Subsequently, the nodes 720-A, 725-A, 725-B may determine the validity of the proposed data records and/or responsive data records (e.g., via a consensus algorithm, smart contract or chaincode logic, etc.). If the proposed data records and/or responsive data records are found by the nodes 720-A, 725-A, 725-B to be valid, they may be appended to a second distributed ledger. Alternatively, if the proposed data records and/or responsive data records are found to be invalid, they may be excluded from the second distributed ledger.

In other embodiments, the second distributed ledger may comprise indications of validity of previously written data records within the distributed ledger 740, rather than validated proposed data records and/or responsive data records. In such embodiments, the indications of validity may be data records that refer back to previously written data records and indicate whether said previously written data record is valid or invalid. In such embodiments, the indications of validity may contain a pointer to the valid or invalid previously written data record.

The following is a description of an exemplary embodiment of the disclosure that illustrates the inter-agency distributed ledger system in further detail. In some embodiments, the agencies may be various organizations (e.g., public service agencies such as police departments, fire departments, hospitals, and the like, or enterprise agencies such as utilities companies, private businesses, and the like) who wish to utilize the inter-agency distributed ledger to store data records associated with particular incidents (e.g., traffic accidents, public disturbances, natural disasters, and the like). Accordingly, the data records within the inter-agency distributed ledger may be data records associated with a particular incident, such as the creation of an incident, the assignment of resources to an incident, the removal of resources from an incident, an indication of various stages/phases of an incident, recorded media or documentary evidence associated with an incident, and the like. In such embodiments, an agent may be assigned a role with respect to the agency or a particular incident, such as an administrator, manager, contributor, or responder. The agent may be an individual such as an employee or associate of the agency. Alternatively, the agent may be an automated agent under the agency's control.

Depending on the agent's status, the system may limit the types of data records that the agent is authorized to submit to the distributed ledger. For instance, submitting incident-related data records that involve the creation of an incident record, changes to the phase of an incident, or assignment of resources (e.g., the dispatch of one or more responders to the incident location) may require the agent to have an "administrator" status. On the other hand, the contribution of incident evidence data (e.g., video/audio footage, reports, and the like) may require that the agent have a "contributor" status. If the agent is not authorized, the lack of authorization may be identified through the intra-agency or inter-agency validation checks as described herein (e.g., a record submitted by the agent may be determined to be invalid).

Once the originating agent 710-A posts a proposed data record, other agents (e.g., the second agents 710-B) within the agency may run a series of checks on the proposed data record based on an internal set of validation criteria. Based on the intra-agency validation checks, the other agents may post responsive data records that indicate whether the other agents have approved or rejected the proposed data record. In some embodiments, the internal set of validation criteria may comprise private information that is only available to the agents within the originating agent's 710-A agency 801. For instance, if the proposed data record involves the creation of an incident record (i.e., establishing a new incident), the internal set of validation criteria may require an originating agent 710-A to be an administrator who is currently clocked into the system. If the proposed data record involves an assignment of a responder (e.g., a police officer) to a particular incident, the other agents may verify that the incident record has been created, that the originating agent is an administrator clocked in to the system, that the responder to be assigned possesses suitable attributes and is not already assigned to another incident, and the like. If the proposed data record involves the removal of a responder from an incident, the agents may verify that the originating agent 710-A is an administrator and the responder to be removed is currently assigned to the incident.

In some embodiments, the intra-agency validation criteria may comprise digital trust factors reflecting a community or history-based reputation of the originating agent. In some embodiments, the digital trust factors may be digitally-encoded values that may be used for validation purposes. In other words, originating agents 710-A that have historically produced valid proposed data records may have a higher digital trust factor assigned or associated with them, which in turn increases the likelihood that the other agents will approve future data records submitted by more highly trusted agents. Data associated with an agent's digital trust factor, as well as other data used for evaluating the intra-agency validation criteria, may be stored on centralized, on-premises agency servers or agency cloud-based storage location, or alternatively may be written to the distributed ledger as an attribute data record. On the other hand, a particular agent that has historically produced invalid (e.g., not validated) proposed data records may be assigned or associated with a lower digital trust factor. In such an event, the system may write a data record to the distributed ledger that indicates the lower digital trust factor of the particular agent. In some embodiments, such as when the proposed data record involves the assignment of resources to an incident, the intra-agency validation criteria may require determining whether the amount of resources assigned to an incident is appropriate, based on historical data. For example, the assignment of one responder to a traffic incident may be considered valid, while the assignment of twenty responders to the same traffic incident may be considered invalid.

Based on the proposed data record and associated responsive data records, each of the external validator nodes within the various external agencies may use validation checks to verify the validity of the proposed data records (and perhaps the validity of the responsive data records as well). In embodiments in which the validation checks are part of the consensus algorithm, the consensus algorithm may be used to conduct a number of validation checks, which may include a verification that the originating agent has an appropriate status for the type of data record being submitted, that assigned resources have not already been assigned to other incidents, and the like. The consensus algorithm may further take into account various trust factors, such as an agency's historical or community-defined reputation over time. Information used to assess the validity of the proposed data records and the responsive data records may be located in the distributed ledger, although the content of the proposed data records and the responsive data records may also be used to assess the validity of such records. Based on the consensus algorithm, each of the external agency's validator nodes may submit a vote to approve or reject the proposed data record. The votes are propagated to the other agencies' nodes until each node has received a threshold number of votes. Responsive to detecting that a threshold number of votes (e.g., more than 2, 4, 9, or 19) or threshold ratio of votes (e.g., more than 50%, 70%, or 90%) to approve the proposed data record has been reached, each node may find the proposed data record to be valid. In some embodiments, each node then subsequently appends the proposed data record to the distributed ledger. In some embodiments, the consensus algorithm may require that a proposed data record be associated with a same or similar threshold number (or ratio) of responsive data records indicating an approval (e.g., the proposed data record must be approved by at least two, three, or ten agents from the originating agency as well). In embodiments where the intra-agency validator node is also allowed to provide a vote, the consensus algorithm may limit the number of intra-agency validator node votes to one, or to a maximum ratio of the overall number of votes (e.g., less than 25%, or less than 10%). Other possibilities exist as well. In other embodiments, any of the validation checks as described above may be executed separately from the consensus algorithm as part of chaincode or smart contract logic. In such embodiments, rather than submitting votes to be used in a consensus algorithm, the nodes may use the consensus algorithm to detect whether each of the nodes has correctly executed the chaincode or smart contract logic and/or that a majority of nodes agree on the results.

In some embodiments, the distributed ledger system 745 may utilize a separate centralized on-premises or cloud-based agency database system 760 to store incident data files, particularly when a request to store a large data file is received. To illustrate, a responder may submit a request to include a video file associated with a particular incident. In such embodiments, the video file itself may be stored on the database system 760, while the proposed data record submitted by the responder to the ledger may comprise a digital fingerprint of the video file (e.g., a hash of the video file or other tamper indicator) as well as a pointer to (and/or cryptographic hash of) the video file's location within the database system 760. In this way, the system may reduce the computing inefficiencies caused by the replication of large data files within the distributed ledger but still maintain an immutable record of the video file upon creation and storage at the database system 760.

An inter-agency distributed ledger provides numerous technical advantages over traditional technology to agencies who wish to store and manage incident and other records. Each node may store a full copy of the distributed ledger such that the incident data is not susceptible to a single point of attack or failure. Furthermore, the inter-agency distributed ledger may prevent invalid data records from being written to the distributed ledger by mitigating failure or compromise at the intra-agency level as well as the inter-agency level (e.g., the originating agent or originating agency's computing devices become subject to a hardware/software error, computer virus, or are otherwise improperly influenced). This ensures that neither a particular agent nor a particular agency can serve as a single point of attack or failure, which in turn greatly increases the security of the system and helps to ensure the validity and integrity of the incident-related and other data records stored on the distributed ledger. Furthermore, if the distributed ledger is a blockchain, the blockchain structure creates an immutable, resilient record of all data associated with an incident or other transaction; because each block may comprise a timestamp and contains data that may not be modified, the blockchain creates a tamper-resistant chain of evidence for all stages of an incident or other transaction (e.g., from an incident's creation to its conclusion).

Figure 9:
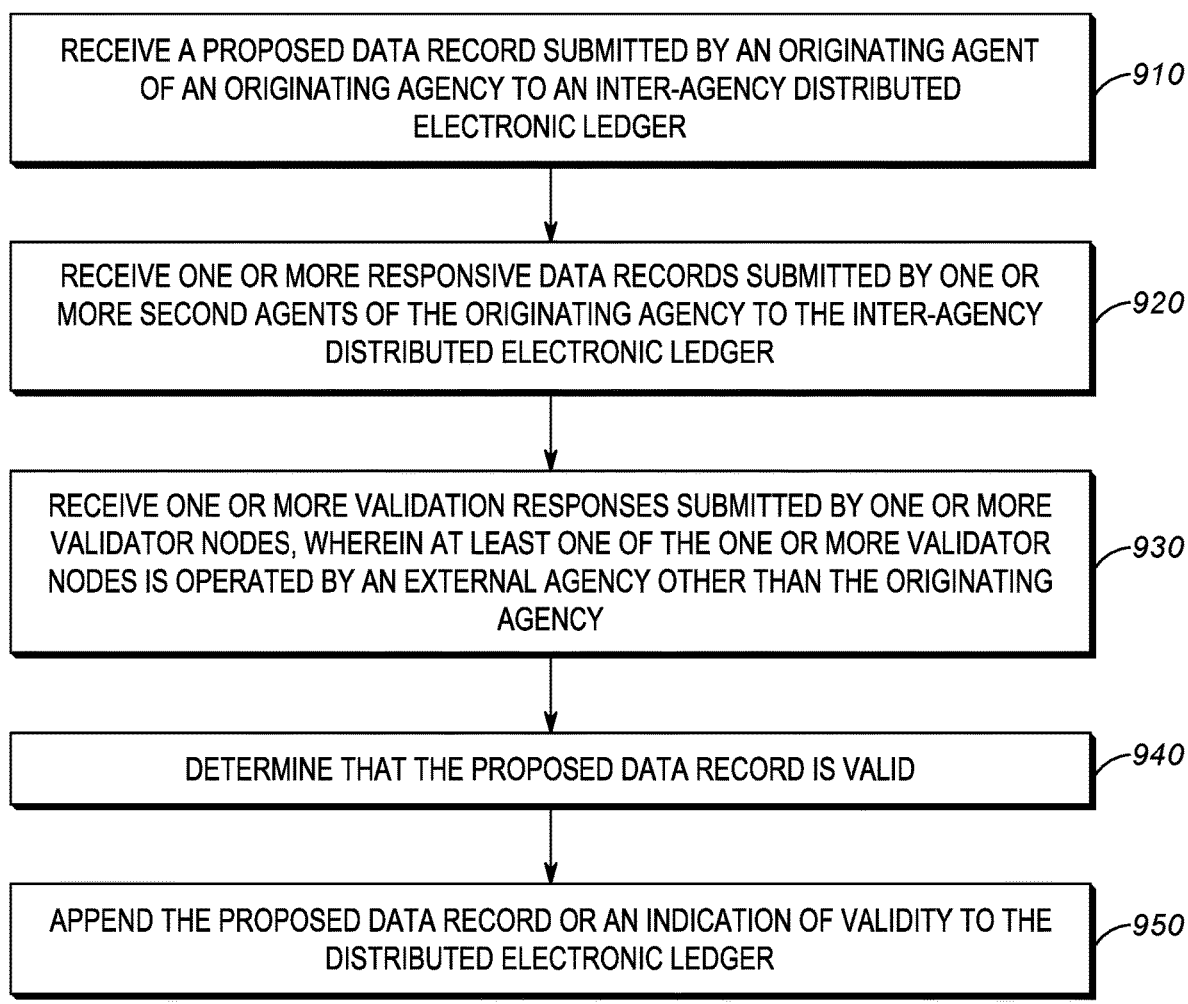
FIG. 9 is a process flow diagram illustrating a method for validating a proposed incident-related data record on the inter-agency distributed ledger, in accordance with some embodiments.

FIG. 9 illustrates a flow chart diagram of the method 900 performed by a computing device or apparatus (e.g., a validator node) within the distributed ledger system. While a particular order of processing steps, message receptions, and/or message transmissions is indicated in FIG. 9 as an example, timing and ordering of such steps, receptions, and transmissions may vary where appropriate without negating the purpose and advantages of the examples set forth in detail throughout the remainder of this disclosure.

The process begins at block 910, where a computer apparatus receives a proposed data record submitted by an originating agent of an originating agency to an inter-agency distributed electronic ledger. In an exemplary embodiment, the proposed data record may be a proposed incident-related data record. In some embodiments, the inter-agency distributed ledger may be an incident-based distributed ledger that may comprise incident-related data records related to a particular incident. In other embodiments, the inter-agency distributed ledger may be an agency distributed ledger that may comprise all data records associated with a particular agency (e.g., the fire department). In some embodiments, the inter-agency distributed electronic ledger is a blockchain, and may take the form of any one or more of the blockchain structures, or equivalent distributed ledger structures, already set forth above.

In some embodiments, the originating agent may be an individual who is an employee or associate of the originating agency, such as an administrator, manager, contributor, or the like. In other embodiments, the originating agent may be an automated agent within the originating agency. The proposed data record submitted by the originating agent may relate to an incident with which the originating agency is involved (e.g., an incident-related data record). For instance, the originating agency may be a police agency and the incident may be a traffic accident. Accordingly, the proposed incident-related data record may be a request to open a new incident record, change a status of the incident (e.g., opened, in progress, resolved, etc.), assign resources to the incident, remove resources from an incident, submit incident evidence data files such as media, document, or text data, and the like. In other embodiments, the proposed incident-related data record may be a request to define resources and/or properties of resources (e.g., define an individual within the agency as a "responder" to the incident and/or assign a skill set to the responder). In some embodiments, the proposed data record is an attribute data record.

In some embodiments, the proposed data records (including incident-related data records and attribute data records) may be stored in a temporary memory pool within the distributed ledger system to await validation before being appended to the distributed ledger. In such embodiments, the proposed data records may be added to the distributed ledger or a second distributed upon being validated and may be excluded from the distributed ledger or the second distributed ledger if found to be invalid. In some embodiments, the proposed data records may be processed and validated in real-time (e.g., as soon as the proposed data records are detected within the temporary memory pool). In other embodiments, the distributed ledger system may wait until the temporary memory pool or other buffer contains a threshold number of proposed data records before validating the proposed data records.

In other embodiments, the proposed data records may be written to the distributed ledger or the second distributed ledger before being validated. In such embodiments, the nodes of the distributed ledger system may evaluate the proposed data record using validation checks (e.g., validation checks defined in a smart contract or chaincode or that are part of a consensus algorithm) after the proposed data record has been written to the distributed ledger or the second distributed ledger. Based on the results of the validation checks performed by the nodes, the nodes may write an indicator of validity (e.g., a data record) to the distributed ledger or the second distributed ledger that refers back to the proposed data record and indicates whether the proposed data record is valid or invalid.

In yet other embodiments, only proposed data records that have been validated may be written to a second inter-agency distributed ledger that is separate from the inter-agency distributed ledger. In such embodiments, proposed data records may be written to a first distributed ledger regardless of the proposed data records' validity. The nodes may then use a consensus algorithm, smart contract logic, chaincode logic, and the like to determine the validity of each proposed data record. If a proposed data record is found to be valid, the proposed data record may be further be appended to a second distributed ledger. Conversely, if the proposed data record is found to be invalid, it may be excluded from the second distributed ledger. In this way, the first distributed ledger may comprise a list of all proposed data records regardless of validity, while the second distributed ledger may comprise only validated data records. Alternatively, the distributed ledger system may, instead of writing full copies of validated data records to the second distributed ledger, the system may write an indicator of validity referring back to the proposed data records previously written to the distributed ledger. The indicators of validity on the second distributed ledger may include pointers to data records within the distributed ledger. In some embodiments, indicators of validity may be written to the second blockchain only to indicate valid data records within the distributed ledger. In other embodiments, indicators of validity may be written to the second blockchain to indicate both valid and invalid data records within the distributed ledger.

If a proposed incident-related data record is a request by a contributor to submit a large data file as incident evidence (e.g., a video file, audio file, image, and the like), the system may store the data file separately from the distributed ledger on a database system. In such embodiments, the data record may, instead of the data file, contain a digital fingerprint (e.g., a hash of the data file or other tamper indicator) and a pointer to the location within the database system in which the data file may be found. At any point thereafter, a user or agent may compare the hash of the file as it currently exists in the database system with the original hash as recorded in the data record to determine whether the file exists in its original form or has been modified. Storing the original hash within the resilient and immutable digital ledger allows the system to readily establish the authenticity of the file that is stored on the database server and referenced in the data record.

As noted above, a proposed incident-related data record may further comprise metadata regarding physical incident evidence. Such metadata may include a description of the physical evidence, the time at which the evidence was collected, the identities of the collectors and/or subsequent custodians of the evidence (e.g., a chain of custody), the current location of the evidence, a bar-code or Radio-Frequency Identification (RFID) tag associated with the evidence, and the like.

The process continues to block 920, where the computer apparatus receives one or more responsive data records submitted by one or more second agents of the originating agency to the inter-agency distributed electronic ledger. The one or more of the second agents may be other individuals within the originating agency, automated agents within the originating agency, or any combination of individuals and computing devices. The responsive data records submitted by each of the one or more second agents may be associated with the proposed data record, and thus indicate whether each second agent approves or rejects the proposed data record. The one or more second agents may determine whether to approve or reject the proposed data record using a set of intra-agency validation criteria, which may include the status of the originating agent, current proposals, past transactions, and/or private intra-agency information. In embodiments in which the proposed data record concerns a creation of an incident record, change in the status of the incident, assignment or removal of resources with respect to an incident, or assignment of attributes to a user and/or agent, the intra-agency validation criteria may require that the originating agent has the status of "administrator." Some of the data needed to evaluate the proposed data record using the intra-agency validation criteria or inter-agency validation criteria may be stored within the distributed ledger.

Other types of data, such as private intra-agency information, might not be stored on the distributed ledger. Instead, said private intra-agency information may be stored on an intra-agency server or restricted access cloud-based data store or a separate intra-agency distributed ledger. Private intra-agency information may also be stored on the distributed ledger, but may be encrypted (or subject to other access controls) so as to prevent access by users/actors outside of the originating agency.

In embodiments in which a proposed incident-related data record is a request to submit incident evidence data files (e.g., video/audio evidence collected from a body camera or microphone, written reports prepared by responders, etc.), the intra-agency criteria may require that the originating agent is classified as a "contributor." Private intra-agency information may also be used, such as whether the agent is currently logged into the system and/or what a current location of the agent is. For example, upon detecting that a responder has submitted a request to upload video evidence of the incident, the system may require that the current location of the responder is consistent with a determined location of the incident, such as by determining that the distance between the responder's current location and the location of the incident (as identified via a caller, a dispatcher, an officer in the field, or some other method and stored in the distributed ledger, at an on-premises agency database, or cloud-based agency database, among other possibilities) are below a specified threshold. The locations may be obtained via GPS coordinates, an IP address, intersection, street address, cellular tower triangulation, and the like.

In embodiments in which the proposed data record is an assignment of a resource to an incident, the intra-agency validation criteria may require that the resource is not currently assigned to another incident. For example, if the proposed data record concerns a dispatch of a responder to an incident, the system may require that the responder has not already been dispatched to another incident. Similarly, if the proposed data record is a removal of a resource from an incident, the intra-agency validation criteria may require that the resource to be removed is in fact currently assigned to the incident from which the resource is to be removed.

The intra-agency validation criteria may further comprise digital trust factors such as historical or community-based reputation data over time. A particular agent may be considered to have a higher degree of trust based on the agent's rank or position in the agency, the agent's time with the agency, or a history of submitting valid proposed data records. On the other hand, a particular agent may be considered to have a lower degree in the event that the agent has a history of submitting invalid proposed data records or that has a short time with the agency, among other possibilities.

Based on the intra-agency validation criteria, each second agent may independently submit a responsive data record that indicates that the second agent either approves or rejects the proposed data record. In some embodiments, the responsive data record is stored in a temporary memory pool to await validation after which it may then be added to the distributed ledger. In some embodiments, the responsive data record may be written to the distributed ledger prior to validation. In yet other embodiments, the responsive data record may be written to a second distributed ledger that contains only validated and/or unvalidated (not validated) responsive data records. In other embodiments, the responsive data record may not be stored on the distributed ledger, and instead may be stored within a private server within the originating agency.

The process continues to block 930, where the computer apparatus receives one or more validation responses submitted by one or more validator nodes, wherein at least one of the one or more validator nodes is operated by an external agency other than the originating agency. Each validator node, which may be owned and/or operated by different external agencies (and some of which by the originating agency), may use validation checks to, based on the proposed data record and the one or more associated responsive data records, submit a validation response that relates to the validity of the proposed data record. In some embodiments, each validator node may perform a series of validation checks as an integral part of the consensus algorithm. In such embodiments, each node may determine whether to vote "yes" or "no" on the validity of the proposed data record and/or the responsive data records. In such embodiments, the "validation response" may be a validation vote. The validation checks may take into account factors such as agent statuses, current proposals, past transactions, various trust factors, and existing validated data records (including incident-related, attribute, and responsive data records). For instance, the validation checks may verify that the originating agent has the correct status (via attribute records already added to the distributed ledger, or via attribute data records stored at a centralized on-premises agency database or cloud-based agency database, among other possibilities) with respect to the data record being proposed (e.g., a request to create an incident record is submitted by an "admin").

For example, the validation checks may cause the validator nodes to verify, in the case of a request to assign resources to an incident, that the resources are not already assigned to another incident (again, via attribute records already added to the distributed ledger, or via attribute data records stored at a centralized on-premises agency database or cloud-based agency database, among other possibilities). Similarly, in the case of a request to remove resources from an incident, the validation checks may cause the nodes to verify that the resources are currently assigned to the incident from which the resource are to be removed (e.g., in a same or similar manner as resource assignment). Some of the data that the validator nodes may use to validate the proposed data records using the validation checks may be found in the existing data records within the distributed ledger. The validation checks may also take into account historical and/or community-based reputation data associated with the agency from which the proposed data record is being submitted. In some embodiments, the validation checks may further cause the nodes to verify the receipt of a threshold number of response records approving the proposed data record. Once a node has performed the validation checks, the node may submit a vote to approve or reject the proposed data record and/or the responsive data records. The vote from each node may then be propagated to the other nodes over the network.

In some embodiments, the validation checks may be part of a consensus mechanism. In other embodiments, the validator nodes may perform validation checks on the proposed data record by executing chaincode (e.g., Hyperledger Fabric) or smart contract logic (e.g., on an Ethereum network) that may be separate from the consensus algorithm logic. In other words, the chaincode or smart contract logic may contain the validation checks. In such embodiments, the chaincode or smart contract logic is used to determine the validity of the proposed data record while the additionally executed consensus algorithm may be used to verify that the chaincode or smart contract logic was correctly executed by the validator nodes and/or that a majority of nodes agree on the results. In such embodiments, the "validation response" may be an indication of whether the chaincode or smart contract logic has been correctly executed and/or that a majority of nodes agree on the results.

In some embodiments, the validator nodes of external agencies perform the validation checks and/or participate in executing the consensus algorithm, while the validator node of the originating agency may be excluded from performing said validation checks and/or participating in the consensus. In other embodiments, the originating agency may also receive the proposed data records and/or the responsive data records, and perform validation checks (e.g., executing smart contract logic) and/or participating in the consensus (e.g., submitting validation votes).

The process continues to block 940, where the computer apparatus determines that the proposed data record is valid. In some embodiments, the system may determine that the proposed data record is valid based on receiving one or more validation responses from the validator nodes. In such embodiments, once each of the nodes in the system have responded or failed to respond within a certain timeframe (e.g., has timed out), each node may, based on the totality of the votes and the consensus mechanism, determine whether to add the proposed data record to the distributed ledger. In embodiments in which the distributed ledger is a blockchain, the proposed data record may be queued to be added to the data records list of the next block in the blockchain. In some embodiments, such as when a particular node is offline, experiencing data corruption, or is otherwise unavailable (e.g., the node submits a contrary vote or does not submit a vote at all), the consensus algorithm may nevertheless allow the remaining nodes to reach a consensus on the validity of the proposed data record. In this way, the distributed ledger system is able to account for situations in which a node experiences failure or is otherwise comprised.

In other embodiments, the computer apparatus may determine that the proposed data record is valid based on validation checks performed by executing chaincode or smart contract logic that may be separate from the logic within the consensus algorithm. In such embodiments, the computer apparatus may determine that the proposed data record is valid independently of validation responses obtained from validator nodes using a consensus algorithm. In such embodiments, the consensus algorithm may allow the nodes to verify that the nodes have accurately or correctly executed the chaincode or smart contract logic and/or that a majority of nodes agree on the results. Once a consensus amongst the nodes has been reached (e.g., the nodes determined that the chaincode or smart contract logic has been correctly executed using a "proof of work" or "proof of stake" algorithm), the proposed data record may be considered to be valid.

The process concludes to block 950, where the system appends the proposed data record or an indication of validity to the distributed electronic ledger. Once each node detects that a threshold number or ratio of "yes" votes has been reached (via a same or similar mechanism as the responsive data records noted above), or the consensus algorithm indicates that chaincode or smart contract logic defining validation checks has been correctly executed and/or that a majority of nodes agree on the results, each node may then append the proposed data record or an indicator of validity to the distributed ledger. If the distributed ledger is a blockchain, the proposed data record may be appended by including the proposed data record in the data records list of the next block in the blockchain. In some embodiments, validated data records may (alternatively or in addition) be written to a second distributed ledger. In some embodiments, responsive data records may also be written to the distributed ledger or the second distributed ledger.

In some embodiments, the proposed data record and/or responsive data records may be written to the distributed ledger (or the second distributed ledger) before being validated. In such embodiments, the system may alternatively store an indication of validity (e.g., a data record) that indicates whether the proposed data record and/or the responsive data record is valid to the same or a different (e.g., second) blockchain.

The following description provides an exemplary scenario to further illustrate several example embodiments. In one embodiment, a police department, fire department, and medical facility may share an inter-agency distributed ledger to store incident-related, attribute, responsive, and/or other data records relative to a traffic accident incident with injuries. A proposed incident-related data record may be submitted to the distributed ledger with each action that an agent/agency takes with respect to the traffic accident incident. Furthermore, each agency may host a node of the distributed ledger, where the nodes may validate the proposed data records submitted to the distributed ledger by various agents within the agencies.

For example, a dispatcher within the police department (e.g., an originating agent) may submit a proposed incident-related data record that opens a new incident record corresponding to the traffic accident incident. In response, one or more second agents within the police department may evaluate the proposed data record and submit a responsive data record that approves or rejects the proposed data record. The nodes of the police department, fire department, and medical facility may then determine the validity of the proposed data record based on data in the proposed data record and the responsive data record(s), as well as based on data already stored in the inter-agency distributed ledger (e.g., attributes of the agents submitting the proposed data record and the responsive data record(s)) and/or at an on-premises agency database or cloud-based agency database.

The process as described above is further applicable to other incident-related proposed data records that are submitted at various stages of other types of incidents. For instance, an admin or dispatcher within the police department may submit a proposed data record that assigns various resources to the car crash incident (e.g., a responder such as a police officer as well as non-human resources such as police vehicles). A responding police officer may then submit proposed data records to update the status of the incident and/or the responder (e.g., update the status of the responder to "in route to the incident" or "on site," update the status of the incident as "pending," etc.).

Once the police officer is on site at an incident, the officer may collect various forms of evidence related to the incident, which may include electronic (e.g., digital) evidence (e.g., video/audio of the incident, the officer's written descriptions and/or reports, witness interviews and/or reports, etc.) and/or physical evidence (e.g., items from car wreckage, chemical samples, biological samples, etc.). In the event that the submitted evidence is electronic (e.g., the officer wishes to upload a video file), the officer may submit a proposed incident-related data record that comprises a digital fingerprint of the video file (e.g., a hash of the video file) and a pointer to the location within a separate database system on which the video file is stored. If the officer wishes to submit a proposed data record regarding physical evidence (e.g., a chemical sample), the officer may submit a proposed data record that comprises metadata regarding the chemical sample, such as where the sample was collected, the time of collection, a description of the sample, the location in which the sample is to be stored, the identities of the collectors and/or custodians of the sample, and the like.

For each incident-related data record submitted to the distributed ledger by an agent, the data record may be validated by one or more second agents (e.g., intra-agency validation) as well as the nodes within the various agencies (e.g., inter-agency validation). This may help ensure that the various agencies involved in an incident may establish a verified ledger of records regarding incidents, the actions taken by the agencies with respect to the incidents, and evidence collected from said incidents.

4. CONCLUSION

In accordance with embodiments of the disclosure, system and methods described herein can be advantageously employed in public safety or enterprise (e.g., utilities, security, electrical, oil/gas, mining, etc) environments to manage incident data records and control workflow. By utilizing a distributed electronic ledger and both intra-agency and inter-agency validation and consensus, public safety and/or utility agencies may be able to avoid the potential pitfalls of using centralized databases that present a single point of attack or failure while establishing a verified, authentic chain of incident evidence.

Furthermore, by using agent and/or incident data and/or metadata to perform validation checks on proposed incident-related data records, embodiments of the present disclosure provide an efficient way to manage agents and resources. For instance, by ensuring that an agent's attributes are compatible with the incident's attributes (e.g., the agent has not already been assigned to another incident, that the agent has the skills, qualifications, and/or job title necessary to handle the incident), embodiments of the disclosure helps to improve the efficiency of agency workflows by preventing misallocation or duplicative allocation of agents and other resources to the incidents that such resources have been tasked to resolve. Furthermore, the system may perform validation checks using tamper-resistant data records that are already validated and immutably stored on the distributed ledger (e.g., data records that have already been validated). As a result, future data records may be validated to a greater level of confidence in comparison to conventional methods.

The present disclosure provides further benefits over conventional technology. For instance, the operations used to validate data records in the inter-agency distributed ledger use multiple levels of validation checks, which protects the data records in the event that an agent within an agency is compromised (e.g., the set of internal validation criteria) or if an entire agency is compromised (e.g., the set of inter-agency validation criteria), and thereby help to ensure that data records are properly validated. In particular, performing validation checks at the inter-agency level provides distributed trust such that no single agency could be compromised and thereby modify data records within the inter-agency distributed ledger. Furthermore, evaluating response data records for each proposed data records submitted within an agency may help ensure that a compromised single agent of a particular agency is unable to add compromised data to the inter-agency distributed ledger. Still further, intra-agency private information can be used to validate records internally before providing the data record to external agencies for further validation, where the external agencies may not be granted access to all of the intra-agency private information used to internally validate the data record. Accordingly, the agency's data records may become less susceptible to a single point of failure.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A computer apparatus acting as a computing node for validating and appending incident-related data records in an intra-agency and inter-agency validated distributed incident information electronic ledger distributed across a plurality of computing nodes including the computer apparatus, where existing record blocks within the intra-agency and inter-agency validated distributed incident information electronic ledger may not be modified by the nodes and new or modified incident information may only be added through the addition of a new record block in the intra-agency and inter-agency validated distributed incident information electronic ledger, the apparatus comprising:
   a communication interface;
   one or more processors;
   a storage device; and
   a memory having executable code stored therein, wherein the executable code, when executed by the processor, causes the processor to:
      receive, via the communication interface, a proposed incident-related data record block submitted by an originating agent computing device associated with an originating agent of an originating agency to be added to the intra-agency and inter-agency validated distributed incident information electronic ledger stored at the storage device;
      receive, via the communication interface, one or more intra-agency responsive data records submitted by one or more second originating agent computing devices associated with second originating agents of the originating agency different from the originating agent but operating under control of the originating agency, wherein the intra-agency responsive data records are associated with the proposed incident-related data record block and provide an intra-agency validation response indicating whether each respective one or more second originating agents have approved or rejected the addition of the proposed incident-related data record block;

receive, via the communication interface, one or more inter-agency validation responses submitted by one or more external agency validator nodes generated as a function of the proposed incident-related data record block, the intra-agency responsive data records, and at least portions of the existing blocks of the intra-agency and inter-agency validated distributed incident information electronic ledger, wherein each of the one or more inter-agency validation responses set forth an indication of whether each respective one of the one or more external agency validator nodes have approved or rejected the addition of the proposed incident-related data record block, wherein the one or more external agency validator nodes are each operated by an external agency other than the originating agency;

determine, by the one or more processors and as a function of the intra-agency responsive data records and the inter-agency validation responses, that the proposed incident-related data record block is valid and, responsively and based on a consensus algorithm executed by the one or more processors in collaboration with the plurality of computing nodes, append one of:

(i) the proposed incident-related data record block to the intra-agency and inter-agency validated distributed incident information electronic ledger to create a revised intra-agency and inter-agency validated distributed incident information electronic ledger and storing the revised intra-agency and inter-agency validated distributed incident information electronic ledger in the storage device and (ii) an indication of validity to the intra-agency and inter-agency validated distributed incident information electronic ledger referencing the proposed incident-related data record block already appended to a second intra-agency and inter-agency pre-validation distributed incident information electronic ledger associated with the incident to create a revised intra-agency and inter-agency validated distributed incident information electronic ledger and storing the revised intra-agency and inter-agency validated distributed incident information electronic ledger in the storage device.

2. The computer apparatus according to claim 1, wherein the proposed incident-related data record block is appended to the inter-agency and inter-agency validated distributed incident information electronic ledger in response to determining that the proposed incident-related data record block is valid.

3. The computer apparatus according to claim 1, wherein the indication of validity of the proposed incident-related data record block is appended to the intra-agency and inter-agency validated distributed incident information electronic ledger in response to determining that the proposed incident-related data record block is valid.

4. The computer apparatus according to claim 1, wherein the proposed data record block is appended to the second intra-agency and inter-agency pre-validation distributed incident information electronic ledger regardless of whether the proposed incident-related data record block is valid and the indication of validity referencing the proposed incident-related data record block is appended to the intra-agency and inter-agency validated distributed incident information electronic ledger.

5. The computer apparatus according to claim 1, wherein the received one or more inter-agency validation responses are further generated as a function of a digital trust factor assigned to one or both of the originating agent and the originating agency based on the one or more second agent's history or receiving valid or invalid proposed data records from the one or both of the originating agent and the originating agency.

6. The computer apparatus according to claim 1, wherein determining that the proposed incident-related data record block is valid is based at least partially on one or more attributes of the originating agent, wherein the one or more attributes of the originating agent are contained in one or more data records stored on the intra-agency and inter-agency validated distributed incident information electronic ledger.

7. The computer apparatus according to claim 1, wherein:
determining that the proposed incident-related data record block is valid is further based at least partially on one or more attributes of the incident stored in the intra-agency and inter-agency validated distributed incident information electronic ledger.

8. The computer apparatus according to claim 1, wherein the one or more intra-agency responsive data records submitted by the one or more second originating agent computing devices are automated responsive data records from automated second originating agents indicating whether the automated second originating agent has determined that the proposed incident-related data record block satisfies stored, pre-determined intra-agency validation criteria.

9. The computer apparatus according to claim 1,
wherein the intra-agency and inter-agency validated distributed incident information electronic ledger is a blockchain;
and
wherein the proposed incident-related data record block is appended to a new block of the blockchain after a last existing block of the blockchain, and each record block after a first genesis block in the blockchain includes a hash value relative to one or more previous record blocks.

10. The computer apparatus according to claim 1, wherein the intra-agency and inter-agency validated distributed incident information electronic ledger is a permissioned blockchain, wherein the originating agent is authorized to submit proposed incident-related data record blocks to the permissioned blockchain, wherein the one or more second agents associated with the originating agency are authorized to submit responsive data record blocks to the permissioned blockchain, and wherein the one or more external agency validator nodes are authorized to submit validation responses to the permissioned blockchain but not proposed incident-related data record blocks.

11. The computer apparatus according to claim 10, wherein the one or more validator nodes are not authorized to access some portions of the intra-agency and inter-agency validated distributed incident information electronic ledger that are encrypted and accessible to only agents of the agency.

12. The computer apparatus according to claim 1, wherein:
- receiving the proposed incident-related data record block submitted by the originating agent of the originating agency comprises receiving the proposed incident-related data record block from a computing device associated with a police officer of a police agency, wherein the proposed incident-related data record block is associated with a public safety incident, wherein the proposed incident-related data record block comprises electronic evidence retrieved at the public safety incident or metadata of physical evidence retrieved at the public safety incident;
- receiving one or more intra-agency responsive data records submitted by one or more second agents comprises receiving one or more responsive data records comprising the responsive information from computing device associated with one or more second police officer members of the police agency, wherein the responsive information comprises one or more indications that the one or more second police officers have approved the proposed incident-related data record block as valid; and
- determining that the proposed incident-related data record is valid comprises executing one or more inter-agency validation checks, the one or more inter-agency validation checks performed by the one or more external agencies comprising determining that the police officer is currently assigned to the public safety incident, that the location of the police officer is within a threshold distance from the location of the incident, that a role of the police officer is appropriate for the public safety incident, that the police officer is associated with a digital trust factor above a specified threshold, or that the police officer has not been assigned to another incident.

13. The computer apparatus according to claim 1, wherein the proposed incident-related data record block comprises a video of an incident scene taken by a recording device associated with the originating agent, and wherein the executable code, when executed by the one or more processors, causes the one or more processors to:
- store the video at a cloud-based or on-premises agency video database communicably coupled to the apparatus; and
- refrain from storing the video in the intra-agency and inter-agency validated distributed incident information electronic ledger, but instead, store a hash of the video and a pointer to the location of the video at the video database in the intra-agency and inter-agency validated distributed incident information electronic ledger.

14. The computer apparatus of claim 1, wherein the one or more intra-agency responsive data records include at least one intra-agency responsive data record that validates the proposed incident-related data record block responsive to a determination that the originating agent is assigned to a particular talkgroup for group communications associated with the incident.

15. The computer apparatus of claim 1, wherein the originating agency is one of a police agency, fire department agency, and medical department agency, and the external agency is selected from remaining ones of the police agency, fire department agency, and medical department agency.

16. The computer apparatus of claim 1, wherein the inter-agency validation responses are processed only subsequent to, and responsive to, a determination by the one or more processors as a function of the intra-agency responsive data records that the proposed incident-related data record block is valid.

17. The computer apparatus of claim 1, wherein the intra-agency and inter-agency validated distributed incident information electronic ledger is a hybrid/permissioned distributed ledger having a first portion encrypted and only accessible to agents associated with the originating agency, and a second portion that is publically accessible.

18. The computer apparatus of claim 1, wherein the proposed incident-related data record block seeks to change a phase of an incident identified in the intra-agency and inter-agency validated distributed incident information electronic ledger or assign one or more first responders to an incident location identified in the intra-agency and inter-agency validated distributed incident information electronic ledger, and at least one of the one or more external agency validator nodes generate an inter-agency validation response received at the computer apparatus that determines, from other existing data record blocks in the intra-agency and inter-agency validated distributed incident information electronic ledger accessible to the external agency validator nodes, that the originating agent submitting the proposed incident-related data record block has been assigned an administrator status.

19. The computer apparatus of claim 18, wherein the one or more intra-agency responsive data records include an employee identification indicative of whether the originating agent is a current employee of the originating agency.

20. The computer apparatus of claim 1, wherein the proposed incident-related data record block seeks to add video or audio footage of the incident captured by the originating agent to the intra-agency and inter-agency validated distributed incident information electronic ledger or a written report associated with the incident and prepared by the originating agent to the intra-agency and inter-agency validated distributed incident information electronic ledger, and at least one of the one or more external agency validator nodes generate an inter-agency validation response received at the computer apparatus that determines, from other existing data record blocks in the intra-agency and inter-agency validated distributed incident information electronic ledger accessible to the external agency validator nodes, that the originating agent submitting the proposed incident-related data record block has been assigned a contributor status.

21. The computer apparatus according to claim 1, wherein the received one or more intra-agency responsive data records are further generated as a function of a digital trust factor assigned to the originating agent based on the originating agent's history of submitting valid or invalid proposed data records.

22. The computer apparatus according to claim 1, wherein the determination that the proposed incident-related data record block is valid is further determined as a function of a digital trust factor assigned to the originating agent based on the originating agent's rank or position at the originating agency.

23. The computer apparatus according to claim 1, wherein the consensus algorithm executed by the one or more processors in collaboration with the plurality of computing nodes requires a threshold number of validity determinations to be made by the plurality of computing nodes before appending the proposed incident-related data record block to the intra-agency and inter-agency validated distributed incident information electronic ledger.

24. The computer apparatus according to claim 23, wherein the threshold number of validity determinations is a relative number determined as a function of an overall number of validity determinations received.

25. A computer program product for validating and appending incident-related data records in an intra-agency and inter-agency validated distributed incident information electronic ledger, the computer program product comprising at least one non-transitory computer readable medium having computer-readable program code portions embodied therein, the computer-readable program code portions comprising:
  an executable portion for receiving, via a computer apparatus acting as a computing node for validating and appending incident-related data records in an intra-agency and inter-agency validated distributed incident information electronic ledger distributed across a plurality of computing nodes including the computer apparatus, where existing record blocks within the intra-agency and inter-agency validated distributed incident information electronic ledger may not be modified by the nodes and new or modified incident information may only be added through the addition of a new record block in the intra-agency and inter-agency validated distributed incident information electronic ledger, a proposed incident-related data record block submitted by an originating agent computing device associated with an originating agent of an originating agency to be added to the intra-agency and inter-agency validated distributed incident information electronic ledger stored at the storage device;
  an executable portion for receiving, via the computer apparatus, one or more intra-agency responsive data records submitted by one or more second originating agent computing devices associated with second originating agents of the originating agency different from the originating agent but operating under control of the originating agency, wherein the intra-agency responsive data records are associated with the proposed incident-related data record block and provide an intra-agency validation response indicating whether each respective one or more second originating agents have approved or rejected the addition of the proposed incident-related data record block;
  an executable portion for receiving, via the computer apparatus, one or more inter-agency validation responses submitted by one or more external agency validator nodes generated as a function of the proposed incident-related data record block, the intra-agency responsive data records, and at least portions of the existing blocks of the intra-agency and inter-agency validated distributed incident information electronic ledger, wherein each of the one or more inter-agency validation responses set forth an indication of whether each respective one of the one or more external agency validator nodes have approved or rejected the addition of the proposed incident-related data record block, wherein the one or more external agency validator nodes are each operated by an external agency other than the originating agency;
  an executable portion for determining, as a function of the intra-agency responsive data records and the inter-agency validation responses, that the proposed incident-related data record is valid and, responsively and based on a consensus algorithm executed by the computer apparatus in collaboration with the plurality of computing nodes, appending, via the computer apparatus, one of:
    (i) the proposed incident-related data record block to the intra-agency and inter-agency validated distributed incident information electronic ledger to create a revised intra-agency and inter-agency validated distributed incident information electronic ledger and storing the revised intra-agency and inter-agency validated distributed incident information electronic ledger in the storage device and (ii) an indication of validity to the intra-agency and inter-agency validated distributed incident information electronic ledger referencing the proposed incident-related data record block already appended to a second intra-agency and inter-agency pre-validation distributed incident information electronic ledger associated with the incident to create a revised intra-agency and inter-agency validated distributed incident information electronic ledger and storing the revised intra-agency and inter-agency validated distributed incident information electronic ledger in the storage device.

26. A computer-implemented method for validating and appending incident-related data records in an intra-agency and inter-agency validated distributed incident information electronic ledger, the method comprising:
  receiving, via a computer apparatus acting as a computing node for validating and appending incident-related data records in an intra-agency and inter-agency validated distributed incident information electronic ledger distributed across a plurality of computing nodes including the computer apparatus, where existing record blocks within the intra-agency and inter-agency validated distributed incident information electronic ledger may not be modified by the nodes and new or modified incident information may only be added through the addition of a new record block in the intra-agency and inter-agency validated distributed incident information electronic ledger, a proposed incident-related data record block submitted by an originating agent computing device associated with an originating agent of an originating agency to be added to the intra-agency and inter-agency validated distributed incident information electronic ledger stored at the storage device;
  receiving, via the computer apparatus, one or more intra-agency responsive data records submitted by one or more second originating agent computing devices associated with second originating agents of the originating agency different from the originating agent but operating under control of the originating agency, wherein the intra-agency responsive data records are associated with the proposed incident-related data record block and provide an intra-agency validation response indicating whether each respective one or more second originating agents have approved or rejected the addition of the proposed incident-related data record block;
  receiving, via the computer apparatus, one or more inter-agency validation responses submitted by one or more external agency validator nodes generated as a function of the proposed incident-related data record block, the intra-agency responsive data records, and at least portions of the existing blocks of the intra-agency and inter-agency validated distributed incident information electronic ledger, wherein each of the one or more inter-agency validation responses set forth an indication of whether each respective one of the one or more external agency validator nodes have approved or rejected the addition of the proposed incident-related data record block, wherein at the one or more external agency validator nodes are each operated by an external agency other than the originating agency;

determining, via the computer apparatus and as a function of the intra-agency responsive data records and the inter-agency validation responses, that the proposed incident-related data record block is valid and, responsively and based on a consensus algorithm executed by the one or more processors in collaboration with the plurality of computing nodes, appending, via the computer apparatus, one of:

(i) the proposed incident-related data record block to the intra-agency and inter-agency validated distributed incident information electronic ledger to create a revised intra-agency and inter-agency validated distributed incident information electronic ledger and storing the revised intra-agency and inter-agency validated distributed incident information electronic ledger in the storage device and (ii) an indication of validity to the intra-agency and inter-agency validated distributed incident information electronic ledger referencing the proposed incident-related data record block already appended to a second intra-agency and inter-agency pre-validation distributed incident information electronic ledger associated with the incident to create a revised intra-agency and inter-agency validated distributed incident information electronic ledger and storing the revised intra-agency and inter-agency validated distributed incident information electronic ledger in the storage device.

* * * * *